(12) United States Patent
Maki

(10) Patent No.: US 10,982,765 B2
(45) Date of Patent: Apr. 20, 2021

(54) DUAL CAM SPRING-LOADED SHIFTING TRANSMISSION ASSEMBLY

(71) Applicant: TEAM Industries, Inc., Bagley, MN (US)

(72) Inventor: Gregory L. Maki, Solway, MN (US)

(73) Assignee: TEAM Industries, Inc., Bagley, MN (US)

( * ) Notice: Subject to any disclaimer, the term of this patent is extended or adjusted under 35 U.S.C. 154(b) by 793 days.

(21) Appl. No.: 15/808,433

(22) Filed: Nov. 9, 2017

(65) Prior Publication Data

US 2018/0135751 A1 May 17, 2018

Related U.S. Application Data

(60) Provisional application No. 62/420,654, filed on Nov. 11, 2016.

(51) Int. Cl.
*F16H 63/24* (2006.01)
*F16H 63/18* (2006.01)
(Continued)

(52) U.S. Cl.
CPC ............. *F16H 63/24* (2013.01); *F16D 21/00* (2013.01); *F16D 23/12* (2013.01); *F16H 63/18* (2013.01);
(Continued)

(58) Field of Classification Search
CPC .......... F16H 63/24; F16H 63/18; F16H 63/32; F16H 2063/3093; F16H 2063/321
(Continued)

(56) References Cited

U.S. PATENT DOCUMENTS 3,125,893 A 3/1964 Bensinger
4,843,901 A 7/1989 Peterson et al.
(Continued)

FOREIGN PATENT DOCUMENTS

CN 101517280 A 8/2009
EP 2053284 A1 4/2009
(Continued)

OTHER PUBLICATIONS

International Searching Authority, International Search Report for PCT Application No. PCT/US2014/038655, Foreign Counterpart to U.S. Appl. No. 14/281,649, dated Sep. 29, 2014, pp. 1-4, Published in: WO.
(Continued)

*Primary Examiner* — Ha Dinh Ho
(74) *Attorney, Agent, or Firm* — Fogg & Powers LLC

(57) ABSTRACT

A shifting system is provided that includes at least one shift fork and shift collar. The at least one shift fork is axially movable on a shift rail. The at least one shift fork further has a second end with spaced side walls and a shift fork pin. The shift collar is axially movable on the shift rail between the spaced side walls of the at least one shift fork. The at least one shift collar has a shift collar pin. A biasing member is configured to bias the at least one shift collar against one of the spaced side walls of the at least one shift fork. A rotating shift drum has at least one shift guide profile that receives at least one of the shift fork pin and the shift collar pin to guide the at least one shift fork during a shift of the shifting system.

20 Claims, 21 Drawing Sheets

(51) Int. Cl.
*F16H 63/32* (2006.01)
*F16H 63/30* (2006.01)
*F16D 21/00* (2006.01)
*F16D 23/12* (2006.01)

(52) U.S. Cl.
CPC ....... *F16H 63/32* (2013.01); *F16D 2023/123* (2013.01); *F16H 2063/3093* (2013.01); *F16H 2063/321* (2013.01)

(58) Field of Classification Search
USPC ...................................................... 74/337.5
See application file for complete search history.

(56) References Cited

U.S. PATENT DOCUMENTS

| | | | |
|---|---|---|---|
| 6,085,607 | A | 7/2000 | Narita et al. |
| 7,137,499 | B2 | 11/2006 | Riefe et al. |
| 8,015,895 | B2 * | 9/2011 | Tomoda ................ F16H 63/18 74/473.36 |
| 8,037,779 | B2 | 10/2011 | Shiozaki et al. |
| 9,062,765 | B2 | 6/2015 | Shiozaki et al. |
| 9,528,603 | B2 | 12/2016 | Maki et al. |
| 2002/0139215 | A1 | 10/2002 | Smith et al. |
| 2003/0221499 | A1 | 12/2003 | Wong |
| 2004/0200683 | A1 | 10/2004 | Amamiya et al. |
| 2004/0220010 | A1 | 11/2004 | Williams |
| 2005/0081664 | A1 * | 4/2005 | Kawakubo ............. F16H 3/089 74/337.5 |
| 2005/0194964 | A1 | 9/2005 | Okada |
| 2008/0156133 | A1 * | 7/2008 | Chen .................... B60W 10/02 74/473.1 |
| 2009/0165545 | A1 | 7/2009 | Fujimoto et al. |
| 2009/0247358 | A1 * | 10/2009 | Kojima ................ F16H 61/688 477/80 |
| 2010/0000363 | A1 * | 1/2010 | Tomoda ................ F16H 63/18 74/473.36 |
| 2010/0251846 | A1 * | 10/2010 | Pick ....................... F16H 63/18 74/473.12 |

FOREIGN PATENT DOCUMENTS

| | | |
|---|---|---|
| EP | 1857716 B1 | 7/2010 |
| EP | 2218946 B1 | 6/2011 |
| JP | 2009012719 A | 1/2009 |
| WO | 2014189860 A1 | 11/2014 |

OTHER PUBLICATIONS

International Searching Authority, "International Search Report for PCT Application No. PCT/US2014/038662", "Foreign Counterpart to U.S. Appl. No. 14/281,649", dated Aug. 25, 2014, pp. 1-4, Published in: WO.

United States Patent and Trademark Office, "Non-Final Office Action for U.S. Appl. No. 14/281,703", dated Oct. 27, 2015, pp. 1-16, Published in: U.S.

International Searching Authority, "International Search Report for PCT Application No. PCT/US2017/060884", "Foreign Counterpart to U.S. Appl. No. 14/281,649", dated Feb. 26, 2018, pp. 1-112, Published in: WO.

* cited by examiner

DUAL CAM SPRING-LOADED SHIFTING TRANSMISSION ASSEMBLY

CROSS-REFERENCED TO RELATED APPLICATIONS

This application claims the benefit of provisional U.S. Patent Application Ser. No. 62/420,654 filed Nov. 11, 2016, which is incorporated herein by reference in its entirety.

BACKGROUND

Transmissions (gearboxes) used in motor vehicles, including All Terrain Vehicles (ATV), Utility Task Vehicle (UTV), motorcycles, etc., commonly use shift dogs (jaw clutches) to select which gear pair (ratio) is used. The "gears" may be range gears such as High, Low, Reverse, etc. or speed ratio gears such as first, second, third, fourth, etc. A common shift mechanism to move the shift forks and shift dogs into and out mesh with the desired gear pair is a shift drum, which is a cylindrical shaft with cam track profiles cut into it that mate with pins on the shift fork. The shift drums are sometimes referred to as "barrel cams". The shift drum is rotated via a single input to the transmission, such as a shift lever.

A typical shift drum system provides sequential shifting though the gears. This means that from a given gear position, one can only shift to an adjacent gear. You cannot skip past intermediate positions. For example, if the shift pattern is high, low, neutral, reverse, park and one is in high, if you want to shift to reverse, you have to move the fork and shift dogs into the low position and engage that gear before you can proceed thru neutral and onto reverse. You can't skip from high directly to reverse.

In a typical shift drum system, if there is no relative motion between the shift dog and mating gear, it is possible for the jaw clutch teeth to land in a blocked condition. Due to the nature of how the shift drum track and fork pin work together, there is a "solid in" type of relationship. A given rotation of the drum produces a given axial travel of the shift fork and dog. This would prevent the shift dog and fork from fully engaging that gear, until relative motion allows the teeth to engage. In the example above, a shift from high to reverse with the dog landing in the blocked condition, the shift could not be completed unless the vehicle is rocked to make the driveline shafts rotate or the engine is revved to make the transmission input shaft rotate.

For the reasons stated above and for other reasons stated below which will become apparent to those skilled in the art upon reading and understanding the present specification, there is a need in the art for and effective and efficient transmission.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. Embodiments provide a transmission having spring loaded-pass through functionality that improves shift effort and shift quality by eliminating forces and frictions associated with spring elements and associated components working against each other.

In one embodiment, a shifting system is provided that includes a gear assembly, a shift rail assembly and a shift drum assembly. The gear assembly includes a gear shaft, at least one gear mounted on the gear shaft and at least one shift dog. The at least one shift dog is axially movable on the gear shaft while locked to a rotation of the gear shaft. The at least one shift dog is configured to selectively lock rotation of the at least one gear to the at least one shift dog. The shift rail assembly includes a shift rail, at least one shift fork, at least one shift collar and at least one biasing member. The at least one shift fork is axially movable on the shift rail. The at least one shift fork has a first end engaged with the at least one shift dog of the gear assembly. The at least one shift fork further has a second end with spaced side walls and a shift fork pin that extends from one of the spaced side walls. The at least one shift collar is axially movable on the shift rail between the spaced side walls of the at least one shift fork. The at least one shift collar has a shift collar pin. The at least one biasing member is configured to bias the at least one shift collar against one of the spaced side walls of the at least one shift fork. The shift drum assembly is configured to rotate during a shift. The shift drum has at least one shift guide profile that receives at least one of the shift fork pin and the shift collar pin to guide the at least one shift fork during a shift of the shifting system.

In another embodiment, a shifting system is provided that includes a shift drum having a plurality of cam tracks, at least one shift dog, at least one gear, a shift rail, at least one shift fork, at least one sub-fork and a biasing member for each at least one sub-fork. The at least one shift dog is configured to selectively engage the at least one gear. The at least one shift fork has a first end engaged with the at least one shift dog and a second end slidably coupled to the shift rail. The second end of the at least one main shift fork has a shift fork pin received in a first cam track of the plurality of cam tracks of the shift drum assembly. The at least one sub-fork is further slidably coupled to the shift rail. The at least one sub-fork has a sub-fork pin received in a second cam track of the plurality of cam tracks of the shift drum assembly. The biasing member for each at least one sub-fork is received around the shift rail. The at least one sub-fork and biasing member are positioned such that pushing the at least one sub-fork in a first direction causes it to solidly push against a first sidewall of the second end of the at least one shift fork so that the at least one sub-fork moves in concert with the at least one shift fork. The at least one sub-fork and biasing member are further positioned such that movement of the at least one sub-fork in a second direction on the shift rail pushes against the biasing member which in turn pushes against a second sidewall of the second end of the at least one shift fork compressing the biasing member to create a preload bias that is used at least in part to pass thru the at least one gear without requiring shift dog teeth of the at least one shift dog and at least one gear to fully mesh.

In yet another embodiment, a vehicle is provided that includes a motor to provide motor torque, a transmission to receive the motor torque, a drivetrain coupled to receive torque from the transmission and a shifting system. The shifting system includes a shift rail assembly and a shift drum assembly. The shift rail assembly includes a shift rail, at least one shift fork, at least one shift collar and at least one biasing member. The at least one shift fork is axially movable on the shift rail. The at least one shift fork has a first end engaged with at least one shift dog of a gear assembly of the transmission. The at least one shift fork further has a second end with spaced side walls and a shift fork pin extending from one of the spaced side walls. The at least one shift collar is axially movable on the shift rail between the spaced side walls of the at least one shift fork. The at least one shift collar has a shift collar pin. The at least one biasing member is configured to bias the at least one shift collar against one of the spaced side walls of the at least one shift fork. The shift drum assembly is configured to rotate during a shift. The shift drum has at least one shift guide profile that receives at least one of the shift fork pin and the shift collar pin to guide the at least one shift fork during a shift of the shifting system.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a transmission having spring loaded-pass through functionality that improves shift effort and shift quality by eliminating forces and frictions associated with spring elements and associated components working against each other. In an embodiment, a shift fork is locked into its "in gear" position for some of the gear positions rather than all of them being held into gear via spring element. Further, some embodiments of the present invention provides a dual cam spring-loaded shifting transmission assembly that allows spring-loaded, pass-thru shifting, while eliminating having one fork biasing spring work against another fork biasing spring. In embodiments, the "main fork" (shift fork) that engages the shift dog straddles, or encases, a shift collar ("sub-fork."). The shift collar is positioned along with a biasing member such that pushing the shift collar in a first direction causes it to solidly push against the main fork. In this first direction, the two components move as if they were one solid component (a single fork). When the shift collar (or sub-fork) is pushed in an opposite, second direction along the shift rail, it pushes against the biasing member, which in turn pushes against the main fork. In this second direction the movement of the main fork, as it is driven via the drum and sub-fork, is spring loaded. The shift fork and shift collars are moved via pins following profiles that form cam tracks in a shift drum as discussed in detail below. If the shift drum has "solid tracks" without "open sections," as the drum is rotated to push the fork subassembly in this direction into a particular gear and the shift dog lands in a blocked condition, the drum can rotate through that position in an embodiment. The shift collar (sub-fork) gets pushed by an associate cam track (profile), which compresses the bias member. As the drum rotates thru the position, the shift collar moves back to its original position and relieves the bias load. This configuration allows for the shift mechanism to pass thru the gear without requiring the shift dog teeth to fully mesh.

Figure 1A:
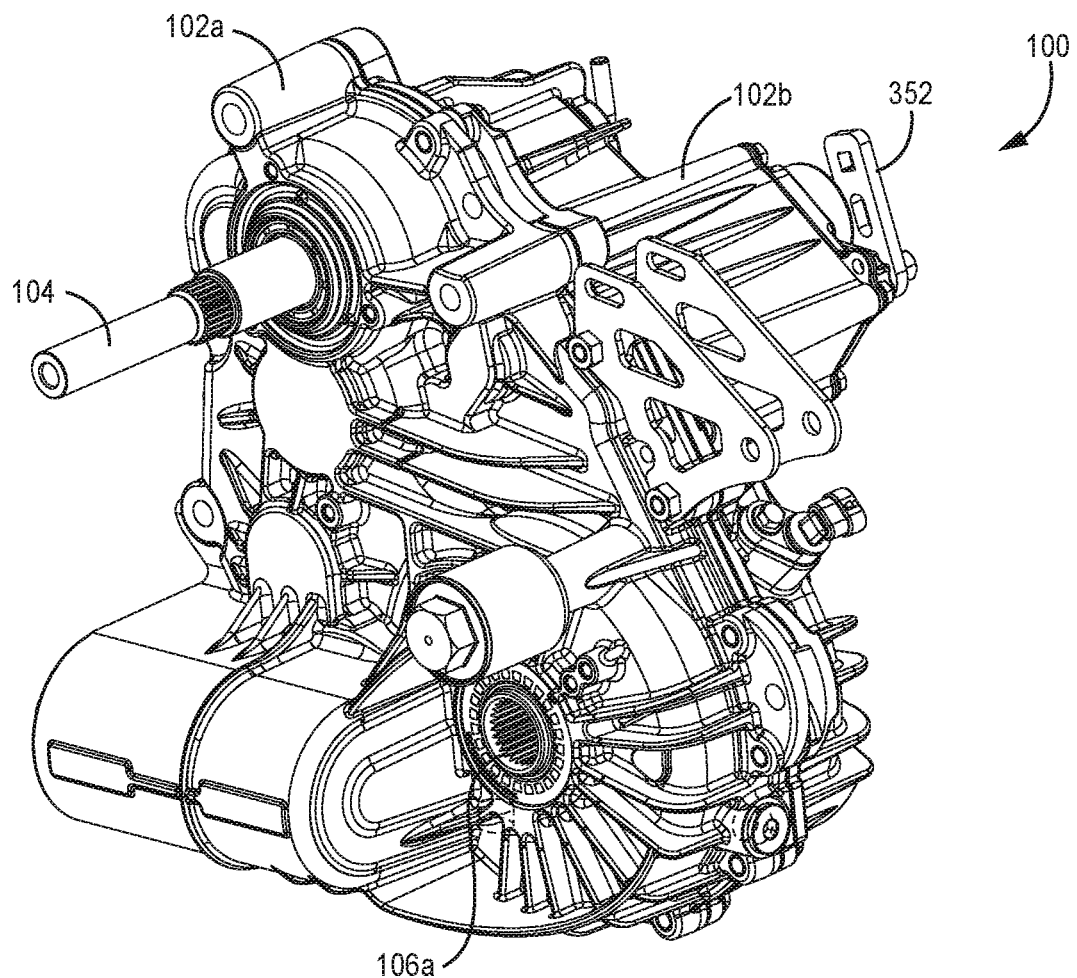
FIG. 1A is a first side perspective view of a gear box of an exemplary embodiment.
Figure 1B:
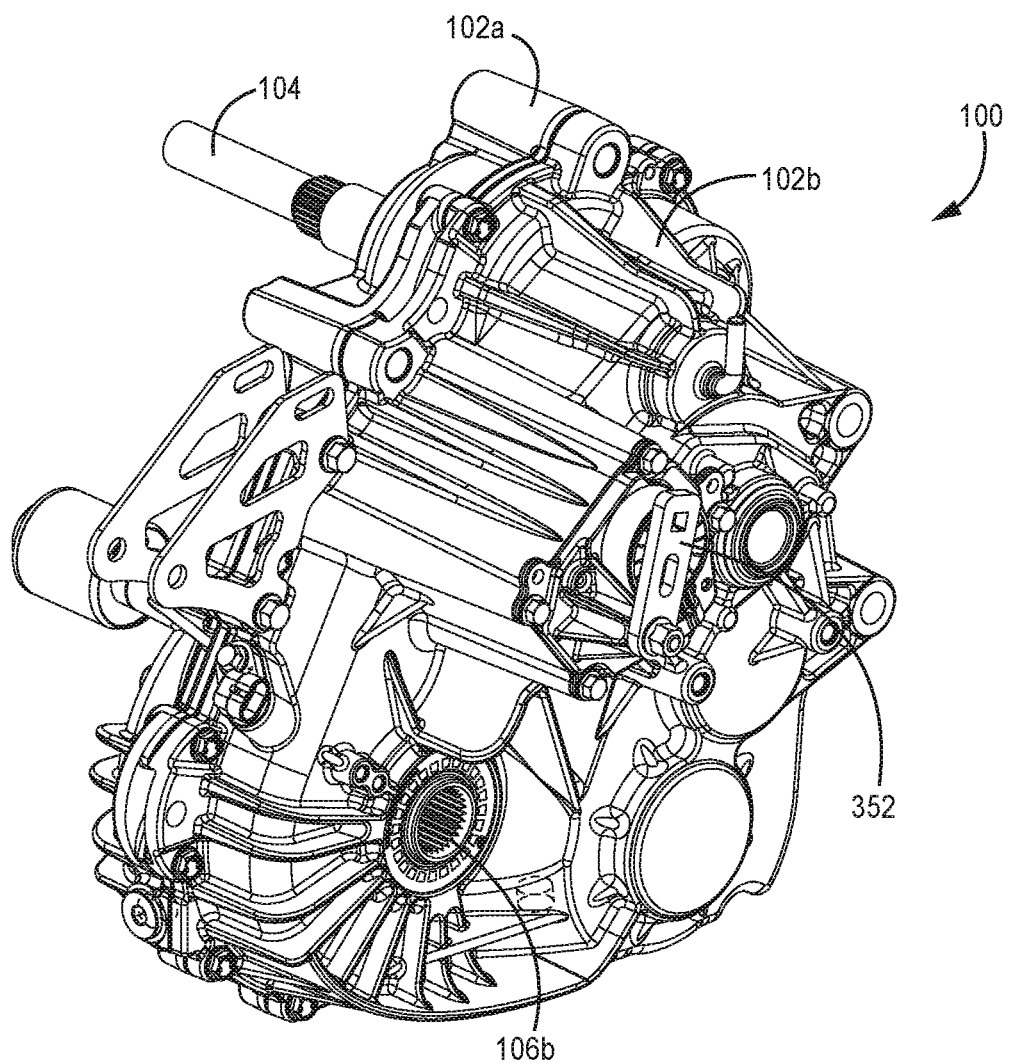
FIG. 1B is second side perspective view of a gear box of the exemplary embodiment of FIG. 1A.

An example of an assembled transmission 100 of one embodiment is illustrated in the side perspective views of FIG. 1A and FIG. 1B. The transmission 100 maybe a transaxle or any type of gear box. In this example, the transmission 100 includes a housing that includes a first housing portion 102a and a second housing portion 102b. The transmission 100 includes an input 104 to receive torque from a motor and at least one output to a drivetrain. The outputs, in this example of a transaxle transmission 100, includes 106a and 106b. Another output, a front output, in this example is not shown in FIGS. 1A and 1B. Further illustrated in FIGS. 1A and 1B is shift drum manipulation member 352 used to rotate a shift drum 220 as further discussed below.

As discussed above, embodiments provide a shifting system for a transmission having spring loaded-pass through functionality that improves shift effort and shift quality by eliminating forces and frictions associated with spring elements and associated components working against each other. An example, of a shifting system 200 that accomplish these features are illustrated in the side perspective view of FIG. 2. The shifting system 200 includes a shift drum manipulation assembly 350, a shift drum assembly 202, a shift rail assembly 250 and a gear assembly 300. Generally, the shift drum manipulation assembly 350 selectively rotates a shift drum 220 of the shift drum assembly 202 which in turn moves shift forks 254 and 256 of the shift rail assembly 250 that manipulate shift dogs 304 and 312 of the gear assembly 300 in shifting gears of the transmission 100.

The shift drum manipulation assembly 350 includes the shift drum manipulation member 352 which may be acted upon when a shift of the transmission 100 is needed. The shift drum manipulation member 352 may be acted upon by an electronic actuator, a hydraulic actuator, a mechanical member, etc. (all not shown) in response to an input of an operator, a shift signal from a transmission control unit, etc. The shift drum manipulation member 352 is coupled to rotate a first gear 356. The first gear 356 is engaged with a second gear 358 which is mounted on (locked in rotation with) the shift drum 220 of the shift drum assembly 202. The shift drum manipulation assembly 350 further includes a detent mechanism 357 that, along with a detent biasing member 354, is configured to prevent the shift drum 220 from unintentionally moving due to vibrations and the like, and to hold drum and associated shifting components in a preloaded state during a blocked shift event as described below.

The gear assembly 300 in this example embodiment includes bearings 302 and 316, a first shift dog 304, a low gear 306, an output gear 308, a reverse gear 310, a second shift dog 312 and a high gear 314 all mounted on a gear shaft 301. The first and second shift dogs 304 and 312 are locked to the rotation of the gear shaft 301 via spline connections that allows the first and second shift dogs 304 and 312 to slide axially along the gear shaft 301. The first and second shift dogs 304 and 312 are selectively axially positioned on the gear shaft via respective shift forks 254 and 256 of the shift rail assembly 250 discussed in detail below.

In this example embodiment, the first shift dog 304 may be referred to as a low/park shift dog 304. When the low/park shift dog 304 is axially positioned to engage the low gear 306, rotation of the low gear 306 is locked to the rotation of the low/park shift dog 304. Further, in an embodiment, the low/park shift dog 304 may be axially positioned in the other direction to engage a park plate (not shown) that would be locked to the housing to prevent the gear shaft 301 from moving when the transmission is placed in park. In an embodiment, when the low/park shift dog 304 is axially positioned between the park plate (not shown) and the low gear 306, the low/park shift dog 304 is in a neutral position in which it freely rotates with the gear shaft 301 without transferring torque.

Figure 2:
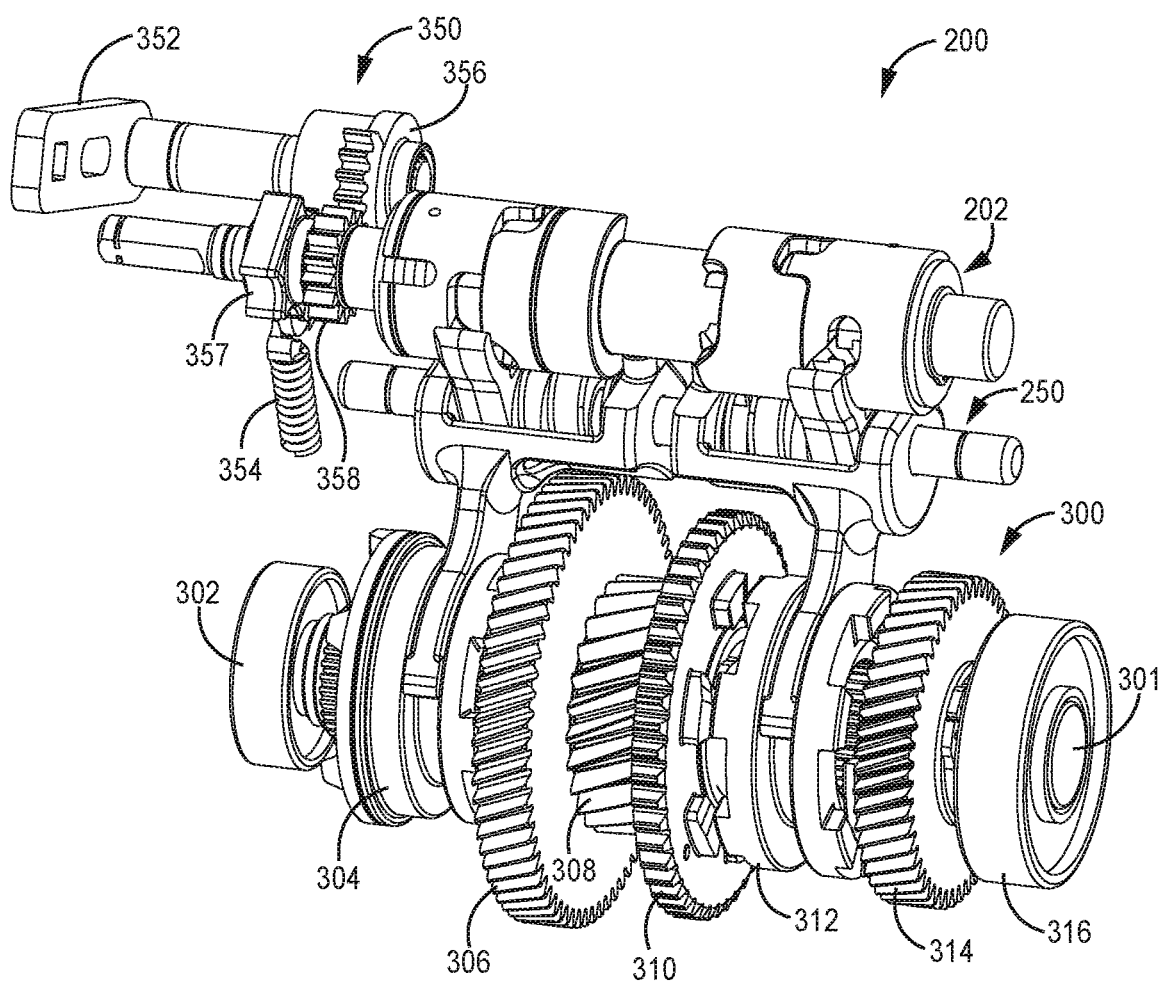
FIG. 2 is a side view of a shifting system of one exemplary embodiment.

Moreover, in this embodiment, the second shift dog 312 may be referred to as a high/rev shift dog 312. When the high/rev shift dog 312 is axially positioned to engage the high gear 314, rotation of the high gear 314 is locked to the rotation of the high/rev shift dog 312. Further, when high/rev shift dog 312 is axially positioned in the other direction to engage the reverse gear 310, the reverse gear 310 is locked to the rotation of the high/rev shift dog 312. When the high/rev shift dog 312 is axially positioned between the reverse gear 310 and the high gear 314, the high/rev shift dog 312 is in a neutral position in which it freely rotates with the gear shaft 301 without transferring torque. In FIG. 2, both the first shift dog 304 and the second shift dog 312 are positioned axially to not transfer torque for illustration purposes. Moreover, the gear assembly 300 is merely an example gears used, other gear arrangements may be used in embodiments that implement the shifting system described.

Figure 3:
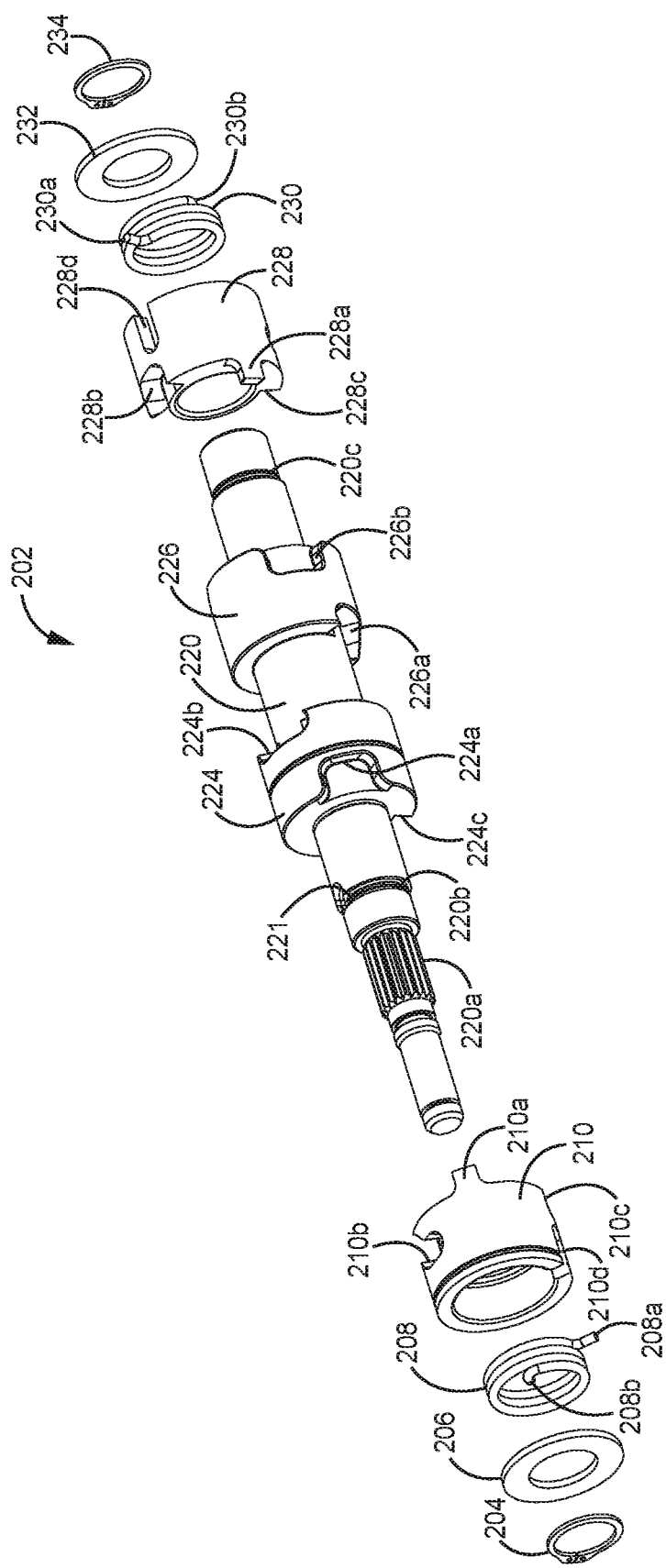
FIG. 3 is an unassembled side perspective view of a shift drum assembly of an exemplary embodiment.
Figure 6A:
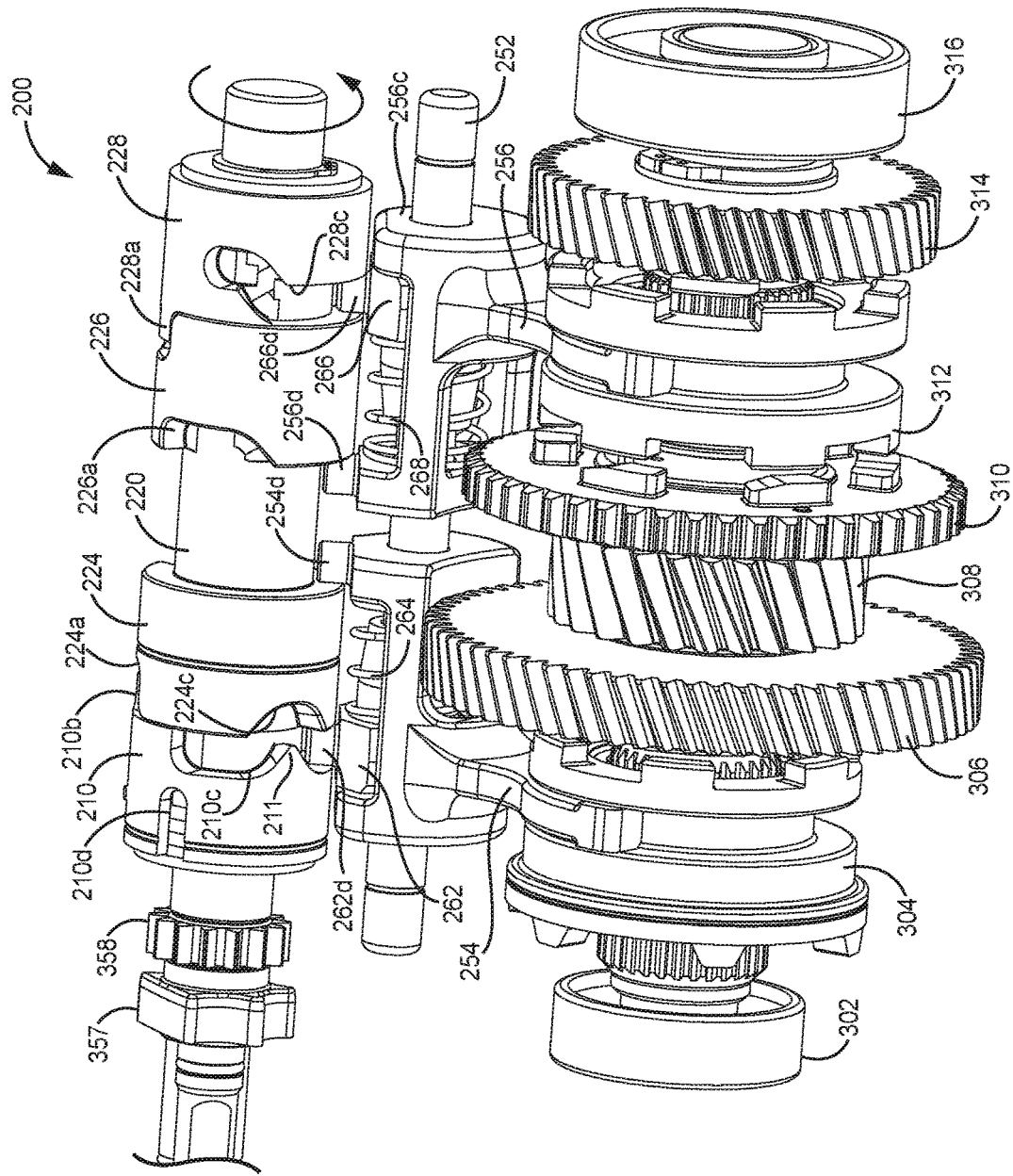
FIG. 6A is a side perspective view of a shifting system of FIG. 2 during a shift.

FIG. 3 illustrates a shift drum assembly 202 of one embodiment. The shift drum assembly 202, includes the shift drum 220 as discussed above. The shift drum 220 includes a first drum collar 224 and second drum collar 226 that is spaced a select distance from the first drum collar 224. The first drum collar 224 includes a first collar window 224a (or first collar window profile) in a first side of the first shift collar 224. The first drum collar 224 further includes a first collar first profile 224b in a second side of the first drum collar 224 and a first collar second profile 224c in the first side of the first drum collar 224 that is positioned a select distance from the first collar window 224a. The first collar second profile 224c is best illustrated in FIG. 6A.

Referring back to FIG. 3, the second drum collar 226 includes a second collar window 226b (or second collar window profile) formed in a first side of the second drum collar 226. The second drum collar 226 further includes a second collar first profile 226a formed in a second side of the second shift collar 226. In an embodiment, the second drum collar 226 has a further profile that has similar features to the first collar second profile 224c of the first shift collar.

Figure 6B:
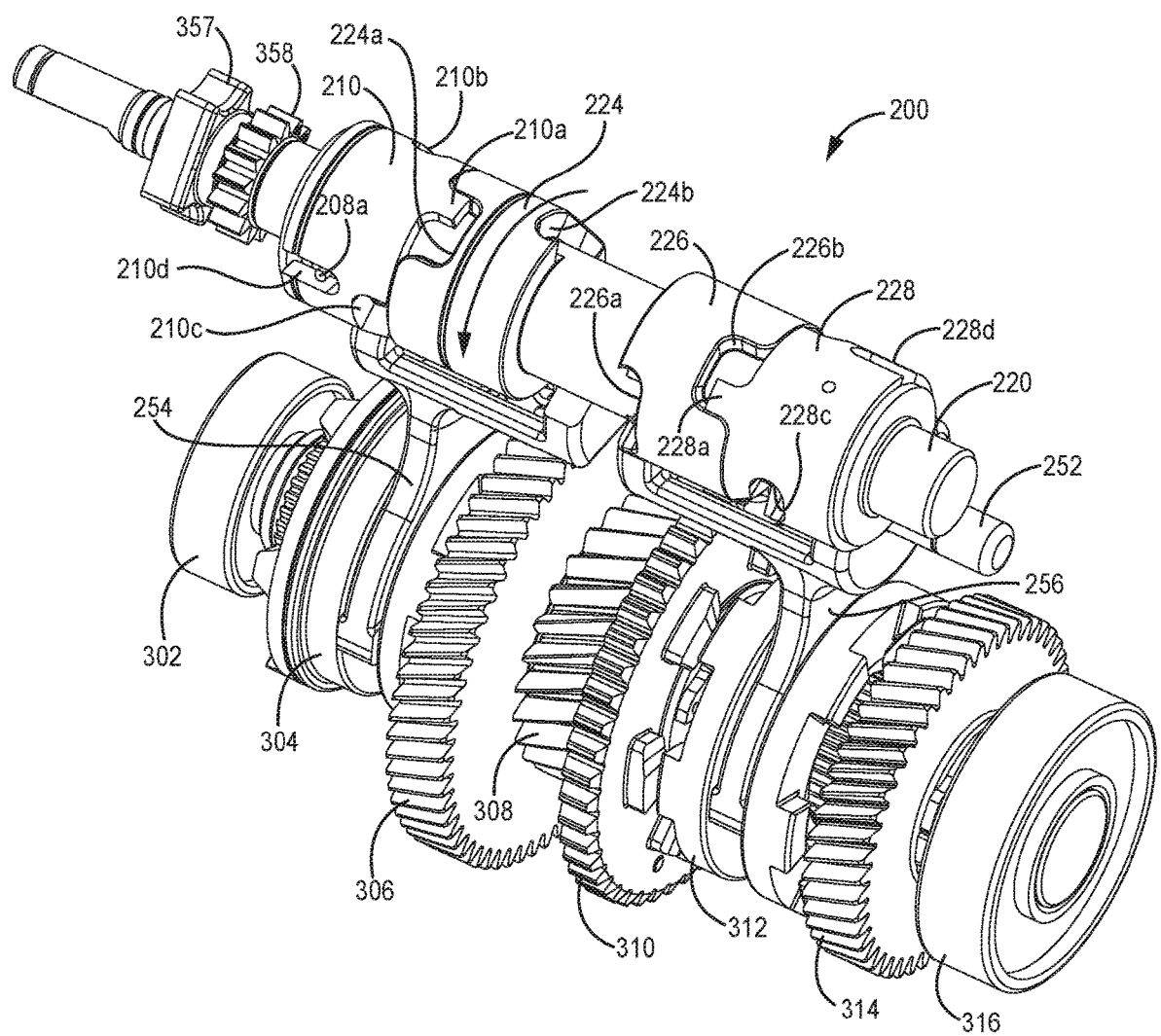
FIG. 6B is a side perspective view of a shifting system of FIG. 2 during a shift.

On a first end of the shift drum 220 is mounted a first shift cam 210 and a first shift cam biasing member 208. The first shift cam 210 includes a first tab 210a that is positioned in the first collar window 224a of the first shift collar 224 (as best illustrated in FIG. 6B). The first shaft cam 210 further includes a first shift cam first profile 210b and a bias slot 210d. A first end 208a of the first shift cam biasing member 208 is positioned within the bias slot 210d of the first shift cam 210. Further a second end 208b of the first shift cam biasing member 208 is received within a biasing bore 221 of the shift drum 220 to bias the first shift cam 210 in relation to the shift drum 220 as further discussed below. A retaining ring 204 received within a first retaining groove 220b of the shift drum 220 and an associated washer 206 retain the first shift cam 210 on the first end of the shift drum 220. The first shift cam 210 further includes a first shift cam second profile 210c with a mid-ramp feature 211 that is best illustrated in FIG. 6A.

On a second end of the shift drum 220 is mounted a second shift cam 228 and a second shift cam biasing member 230. The second shift cam 228 includes a second tab 228a that extends out from a first side of the second shift cam 228 and is positioned in the second collar window 226b of the second shift collar 226 (as best illustrated in FIG. 6B). The second shaft cam 228 further includes a second shift cam first profile 228b and a second shift cam second profile 228c formed in the first side of the second shift collar 226 a spaced distance from the second tab 228a. Moreover, the second shift cam 228 further includes a bias slot 228d formed in a second side of the second shift cam. A first end 230a of the second shift cam biasing member 230 is positioned within the bias slot 228d of the second shift cam 228. Further a second end 230b of the first shift cam biasing member 230 is received within a biasing bore (not shown) of the shift drum 220 to bias the second shift cam 228 in relation to the shift drum as further discussed below. A retaining ring 234 received within a second retaining groove 220c of the shift drum 220 and an associates washer 232 retain the second shift cam 228 on the first end of the shift drum 220.

Figure 4:
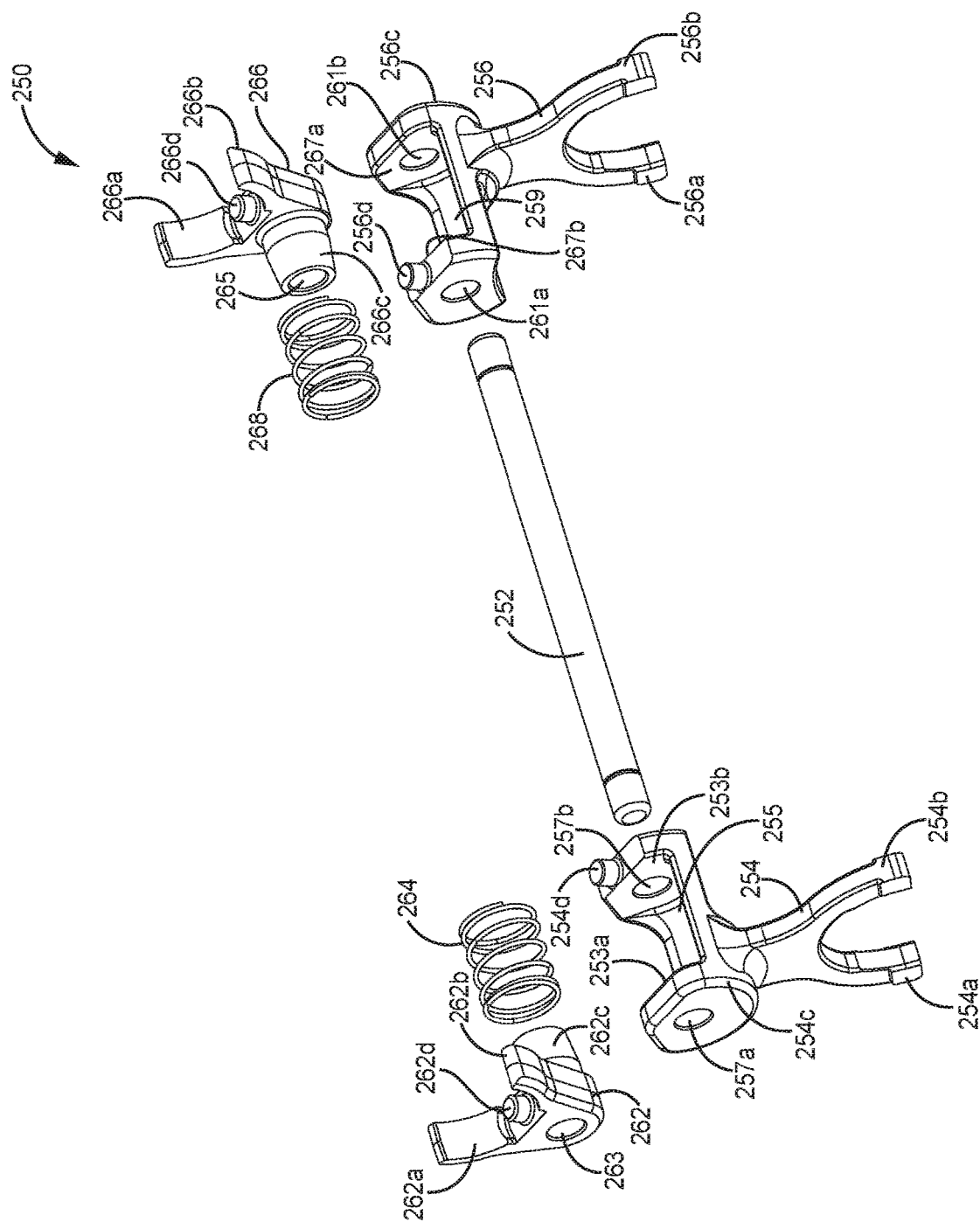
FIG. 4 is an unassembled side perspective view of a shift rail assembly of an exemplary embodiment.
Figure 5:
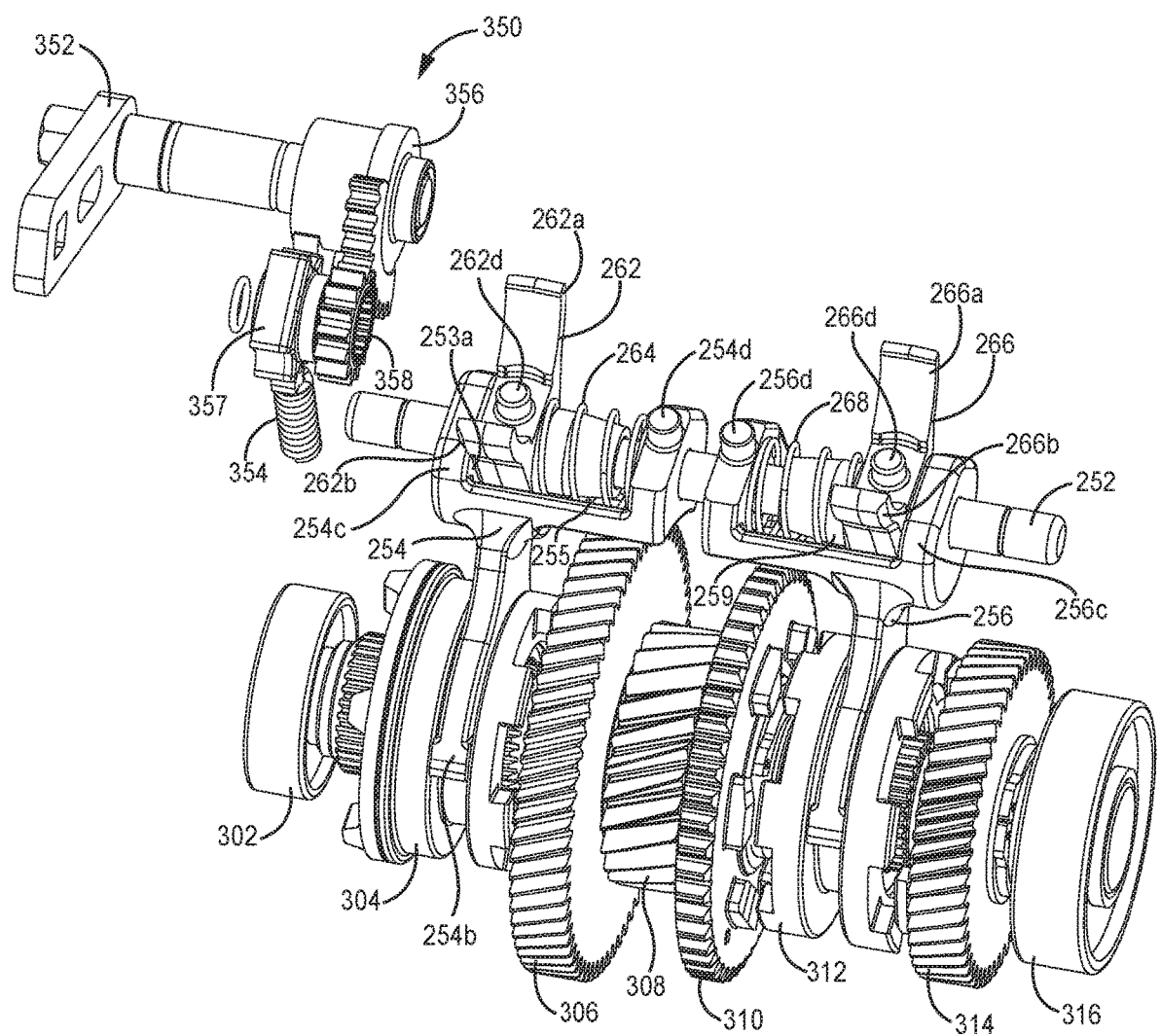
FIG. 5 is a partial assembled side perspective view of a shift drum assembly of an exemplary embodiment.

Referring to FIG. 4, an unassembled view of the shift rail assembly 250 is provided. The shift rail assembly 250 includes a shift rail 252 upon which is mounted a first shift fork 254 and a second shift fork 256. The first shift fork 254 includes a shift dog engagement portion having a first arm 254a and a second arm 254b that are received in a groove of the first shift dog 304 as best illustrated in FIG. 5. The first shift fork 254 further includes a shift drum engaging portion including a first shift fork pin 254d and a shift collar holding portion 254c. The shift collar holding portion 254c has a cavity 255 designed to receive a portion of a first shift collar 262 (first sub-fork) and a first collar biasing member 264. The first shift collar 262 includes a passage 263 that is aligned with passages 257a and 257b in the shift collar holding portion 254c of the first shift fork 254. The shift rail 252 is received within passage 263 of the first shift collar 262 and passages 257a and 257b of the shift collar holding portion 254c. The first shift collar 262 slidably moves axially on the shift rail 252. The first shift collar 262 further includes a first shift collar pin 262d positioned between first and second opposably extending collar arms 262a and 262b that pilot on the first shift cam 210.

The collar arms in an embodiment, are used to keep the shift collar 262 from rotating about the shift rail 252 axis as forces are applied to the pin shift collar pin 262d. There are other ways to accomplish this in other embodiments. For example, a shift collar could have a feature that extends outward and has a second bore for a second shift rail that would restrain rotation. Moreover, a shift fork cavity where the shift collar resides may be designed such that it supports the collar from rotating.

The first shift collar 262 further still includes a bias holding portion 262 upon which a first collar biasing member 264 is received around. The first collar biasing member 264 is positioned, at least partially, within the cavity 255 of the shift collar holding portion 254c to bias the first shift collar 262 away from a second side wall 253b and to seat the first shift collar 262 against a first side wall 253a of the shift collar holding portion 254c in this example embodiment.

The second shift fork 256 of the shift rail assembly 250 includes a shift dog engagement portion having a first arm 256a and a second arm 256b that are received in a groove of the second shift dog 312 as best illustrated in FIG. 5. The second shift fork 256 further includes a shift drum engaging portion including a second shift fork pin 256d and a shift collar holding portion 256c. The shift collar holding portion 256c includes a cavity 259 designed to receive a portion of a second shift collar 266 and a second collar biasing member 268. The second shift collar 266 includes a passage 265 that is aligned with passages 261a and 261b in the shift collar holding portion 256c of the second shift fork 256. The shift rail 252 is received within passage 265 of the second shift collar 266 and passages 261a and 261b of the shift collar holding portion 256c. The second shift collar 266 (second sub-fork) slidably moves axially on the shift rail 252. The second shift collar 266 further includes a second shift collar pin 266d positioned between first and second opposably extending collar arms 266a and 266b that pilot on the second shift cam 228. The second shift collar 266 further still includes a bias holding portion 266c upon which a second collar biasing member 268 is received around. The second collar biasing member 268 is positioned within the cavity 259 of the shift collar holding portion 256c to bias the second shift collar 266 away from a second side wall 267b and to seat the second shift collar 266 against a first side wall 267a of the shift collar holding portion 256c in this example embodiment.

FIG. 5 illustrates the shift rail assembly 250 assembled with the first shift fork 254 engaged with the first shift dog 304 of the gear assembly 300 and the second shift fork 256 engaged with the second shift dog 312 of the gear assembly 300 without the shift drum assembly 202 shown. The first shift collar pin 262d, the first shift fork pin 254d, the second shift fork pin 256d and the second shift collar pin 266d are configured to engage guide surfaces (surface profiles) formed by the first shift cam 210, the first drum collar 224, the second drum collar 226 and the second shift cam 228 to selectively move the shift dogs 304 and 312 to change gearing as described in detail below.

As discussed above, the configuration of the first shift collar 262 in the shift collar holding portion 254c of the first shift fork 254 allows the first shift collar 262 to move axially along the shift rail 252 at least partially independent of the axial movement of the first shift fork 254 in at least one direction with the biasing force of the first collar biasing member 264 biasing the first shift collar 262 against a first side wall of the shift collar holding portion 254c of the first shift fork 254. Similarly, the configuration of the second shift collar 266 in the shift collar holding portion 254c of the second shift fork 256 allows the second shift collar 266 to move axially along the shift rail 252 at least partially independent of the axial movement of the second shift fork 256 in at least one direction with the biasing force of the second collar biasing member 268 biasing the second shift collar 266 against a first side wall of the shift collar holding portion 254c of the second shift fork 256.

FIG. 6A illustrates a side view of the assembled shifting system 200. In FIG. 6A and in subsequent Figures, the first and second shift collars 262 and 266 (sub-forks) are illustrated without the respective first and second opposably extending collar arms 262a, 262b and 266a and 266b to illustrate the position of the respective first shift collar pin 262d, the first shift fork pin 254d, the second shift fork pin 256d and the second shift collar pin 266d. FIG. 6A illustrates the first shift collar pin 262d of the first shift collar 262 positioned within a guide passage formed by the first shift cam 210 and the first drum collar 224 of the shift drum assembly 202. The first shift fork pin 254d of the first shift fork 254 is illustrated as engaging a surface edge of the first drum collar 224. The second shift fork pin 256d of the second shift fork 256 is illustrated as engaging a first edge surface of second drum collar 226. Moreover, the second shift collar pin 266d of the second shift collar 266 is positioned within a guide passage formed by a second edge surface of the second drum collar 226 and the second shift cam second profile 228c formed in the first side surface of the second shift collar 226.

Operation of the shifting assembly is described herein starting at FIG. 6A with the shifting system 200 starting in neutral, going to high and passing through low. As the rotational arrow illustrates in FIG. 6B, in moving from park, the shift drum 220 is rotated counter clockwise in this example embodiment. In doing this, the first shift collar pin 262d of the first shift collar 262 moves towards the mid ramp feature 211 of the first shift cam second profile 210c of the first shift cam 210. At this point, the first shift fork pin 254d, the second shift fork pin 256d and the second shift collar pin 266d are not be push axially along the shift rail 252.

The side perspective view of FIG. 6B illustrates the position of the first tab 210a of the first shift cam 210 engaging a side wall of the first collar window 224a of the first drum collar 224. Hence, rotation of the shift drum 220 counter clockwise, causes the first shift cam 210 to also rotate counter clockwise moving the mid ramp feature 211 of the first shift cam second profile 210c of the first shift cam 210 towards the first shift collar pin 262d of the first shift collar 262.

Figure 7A:
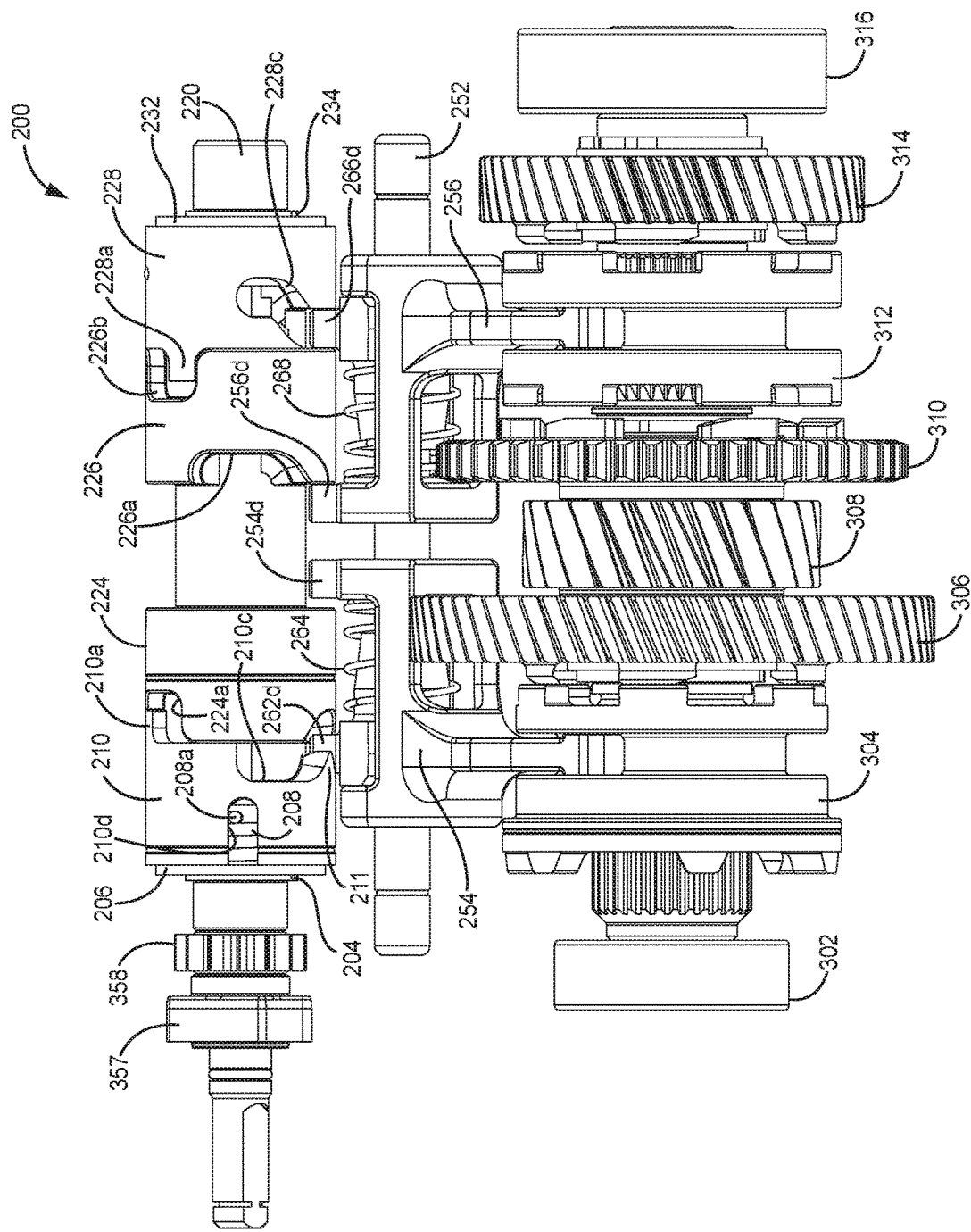
FIG. 7A is a side perspective view of a shifting system of FIG. 2 during a shift.
Figure 7B:
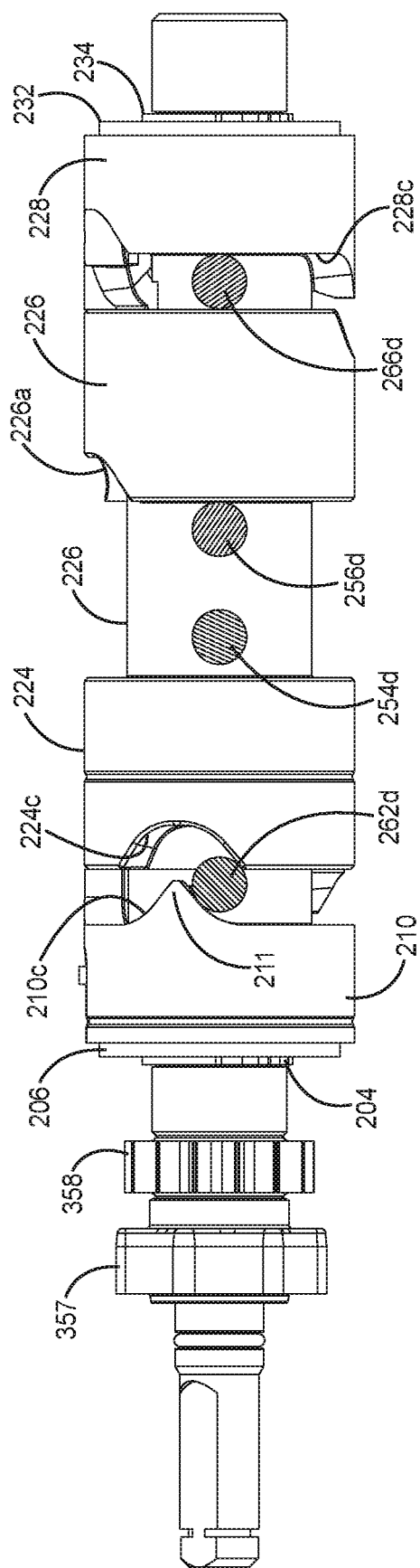
FIG. 7B is bottom view of a shift drum illustration pin placements during a shift of one exemplary embodiment.

FIG. 7A illustrates the first shift collar pin 262d of the first shift collar 262 starting to engage the mid ramp feature 211 of the first shift cam second profile 210c of the first shift cam 210 as the shift drum 220 rotates counter clockwise. FIG. 7B illustrates a bottom view of the shift drum assembly 202 that includes the position of the first shift collar pin 262d, the first shift fork pin 254d, the second shift fork pin 256d and the second shift collar pin 266d in the cam tracks formed by the profiles as the first shift collar 262 starts to engage the mid ramp feature 211 of the first shift cam second profile 210c of the first shift cam 210.

Figure 8A:
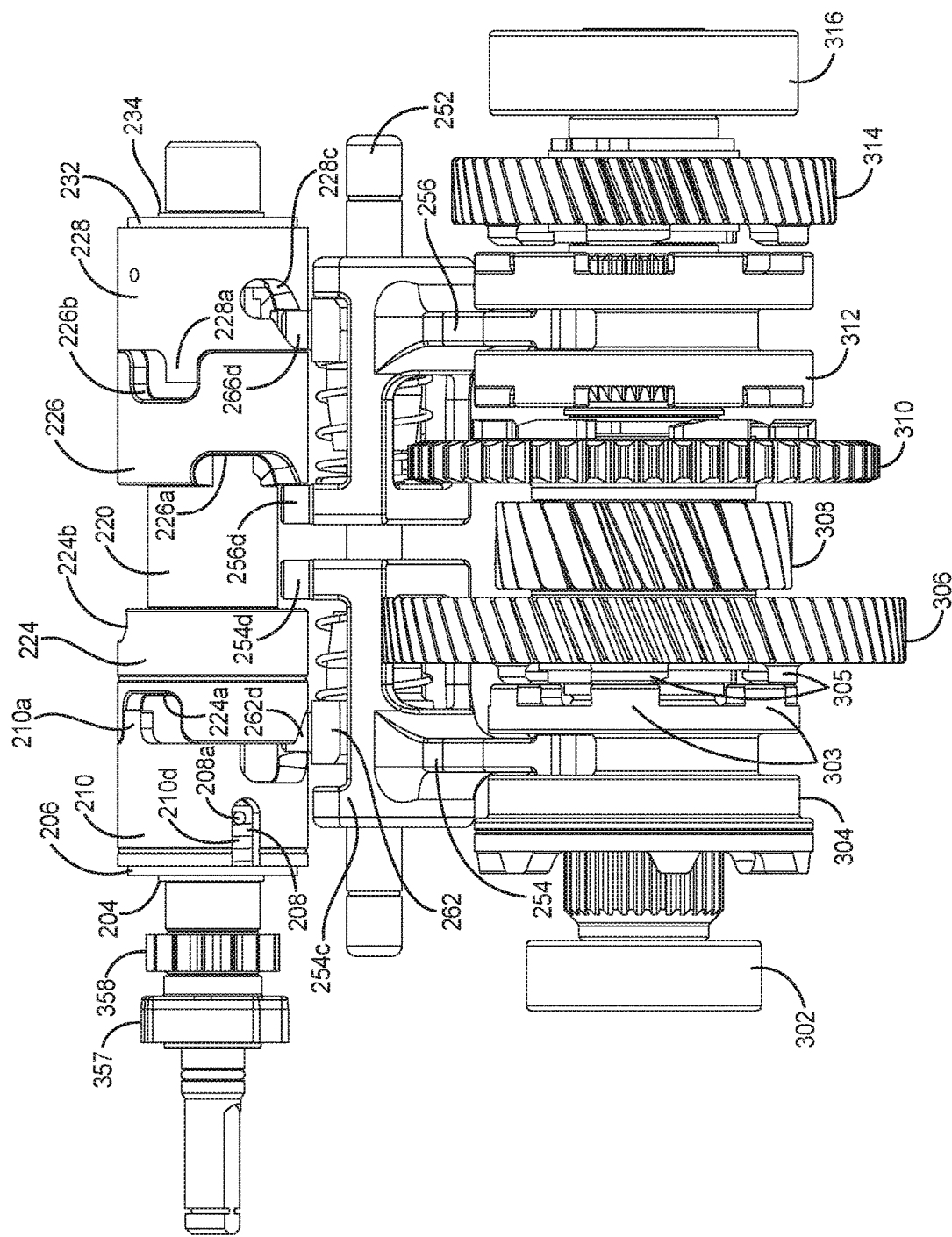
FIG. 8A is a side perspective view of a shifting system of FIG. 2 during a shift.
Figure 8B:
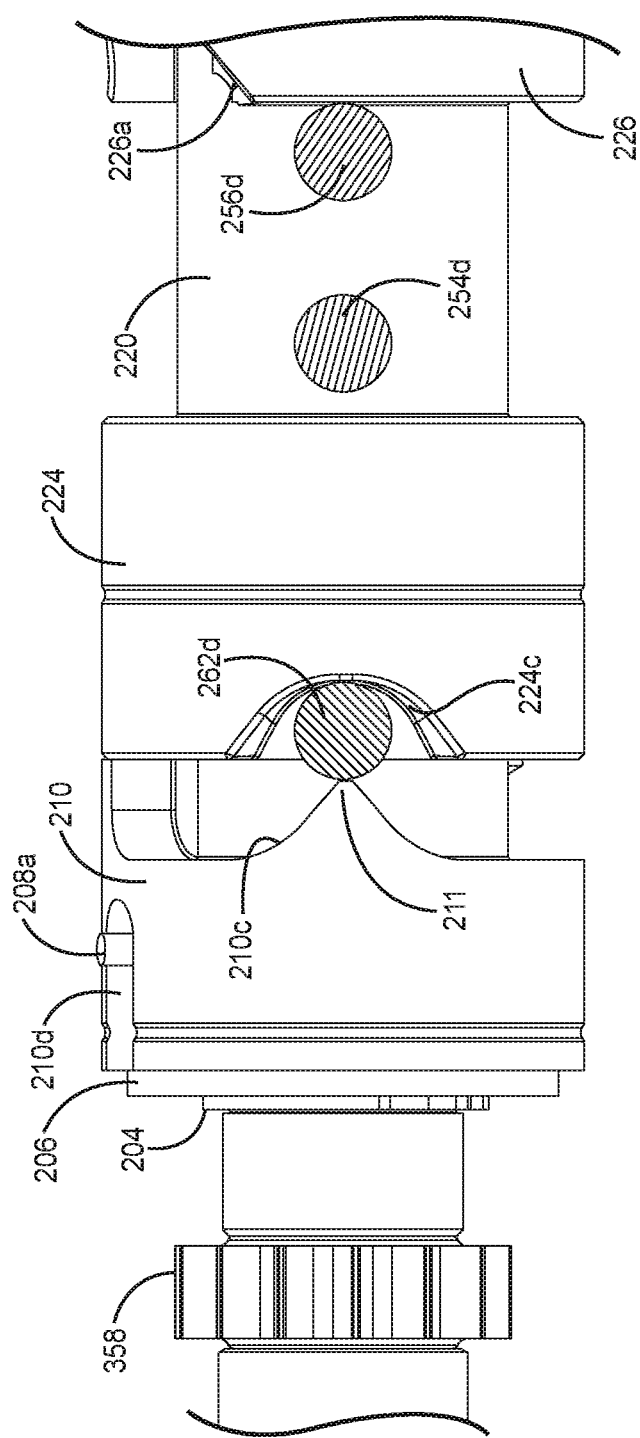
FIG. 8B is partial bottom view of a shift drum illustration pin placements during a shift of one exemplary embodiment.

FIG. 8A illustrates the first shift collar pin 262d of the first shift collar 262 reaching the tip of the mid ramp feature 211 of the first shift cam second profile 210c of the first shift cam 210 as the shift drum 220 rotates counter clockwise. As illustrated in FIG. 8A, the first shift collar 262 is moved away from the first side wall of the shift collar holding portion 254c of the shift fork 262 caused by the first pin shift collar pin 262d moving along the profile of the mid ramp feature 211. This movement compresses the first collar biasing member 264 therein increases a bias force on shift collar holding portion 254c of the first shift fork 254. This bias force causes the first shift dog 304 to move towards the low gear 306. However, as FIG. 8A illustrates, first shift dog teeth 303 of the first shift dog 304 are blocked from engaging the low gear teeth 306 of the low gear 305 because of a misalignment alignment (i.e. they are aligned to engage the top surface of the low gear teeth 305 instead of being aligned to be received between the low gear teeth 305). This is called a blocked condition. The blocked condition creates a spring preload condition. In this preload condition, once the first shift dog 304 rotates relative to low gear 306 and the first shift dog teeth 303 become aligned with the low gear teeth 307, the bias force on the first shift fork 254 pushes the first dog teeth 303 between the low gear teeth 305 to lock rotation of the low gear 306 with the first shift dog. FIG. 8B illustrates a close up bottom view of the shift drum assembly 202 that includes the position of the first shift collar pin 262d, the first shift fork pin 254d, the second shift fork pin 256d, when the first shift collar pin 262d reaches the tip of the mid ramp feature 211. If it is desired to go right into high gear when a block condition in low gear has occurred (i.e. a gear change has been requested before the first shift dog 304 rotates into alignment, the configuration (movement of the first shift collar (first sub-fork) in relation to the first shift fork 254) allows the shifting system 200 to pass through without fully engaging the low gear 306.

Figure 8C:
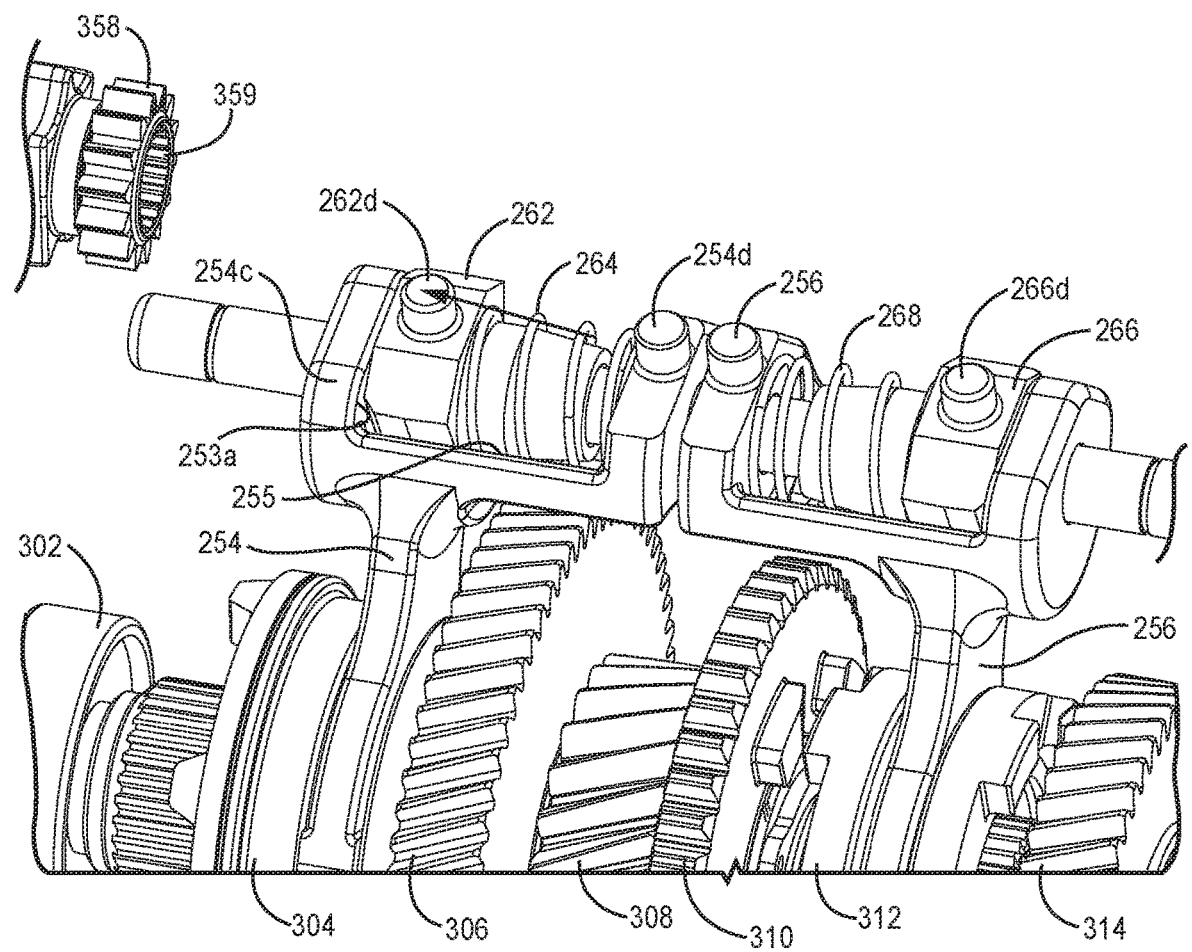
FIG. 8C is a partial close up side view of a shift rail assembly during a shift of one exemplary embodiment.

If the first shift dog 304 is not in the blocked condition during the shift from neutral to low, the first shift collar 262 (first sub-fork) and the first shift fork 254 move together into the low gear position to lock rotation of the low gear 306 with the rotation first shift dog 304. In moving the shift assembly 200 out of first gear 306, the guide path formed by the first shift cam second profile 210c of the first shift cam 210 and the first collar second profile 224c in the first side of the first drum collar 224 on either side of the mid ramp feature 211 of the first shift cam second profile 210c of the first shift cam 210 causes the first shift collar 262 to once again seat against the first side wall 253a of the shift collar holding portion 254c of the first shift fork 254. This is illustrated in FIG. 8C. Since the first shift collar 262 (sub-fork) seats directly against the first shift fork 254 (against the first side wall 253a of the shift collar holding portion 254c of the first shift fork 254), the first shift fork 254 is pushed out of gear. Hence the configuration provides a "solid out" (or "solidly coupled shift out of gear") of the first gear for the shifting system 200.

Figure 9A:
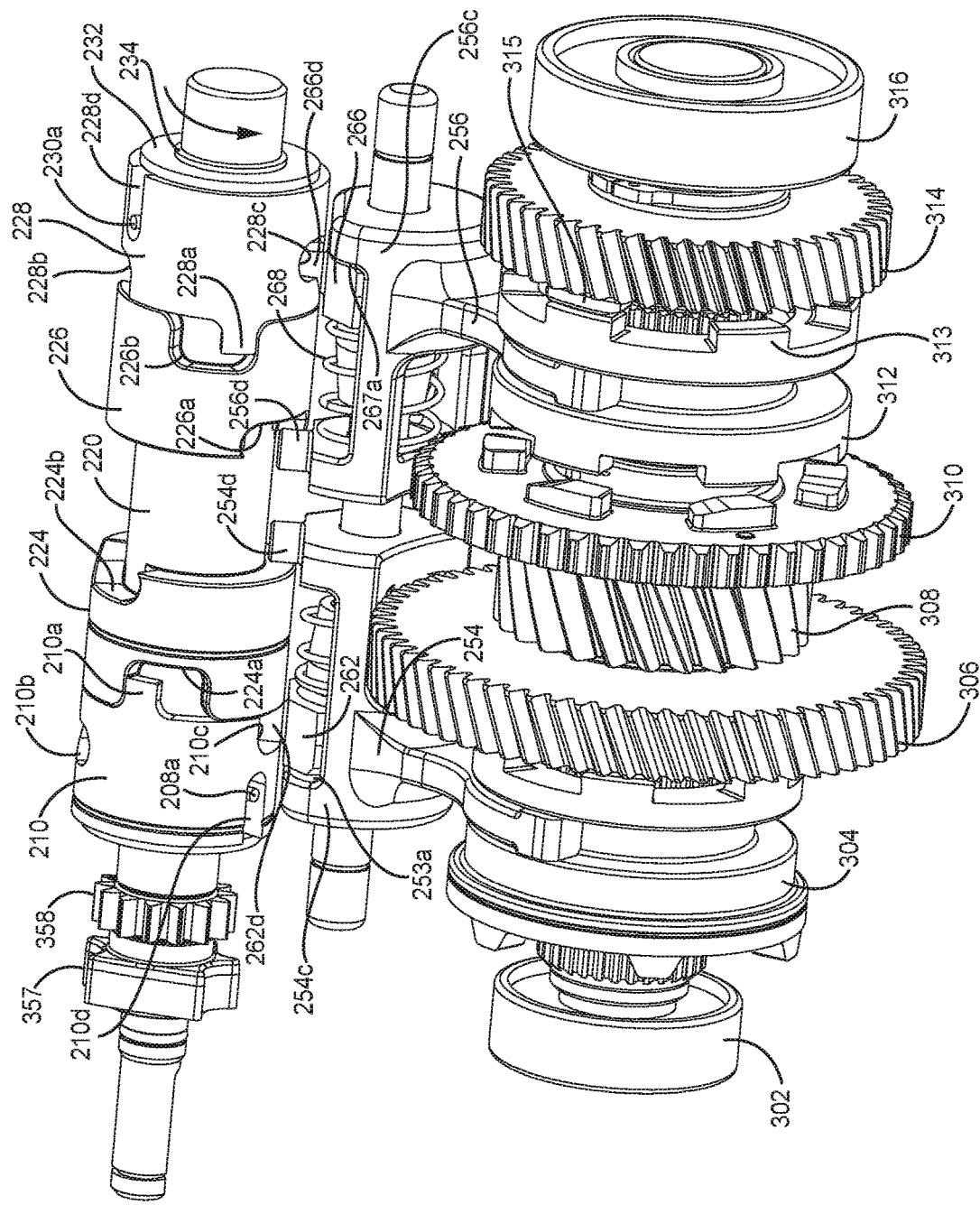
FIG. 9A is a side perspective view of a shifting system of FIG. 2 during a shift.
Figure 9B:
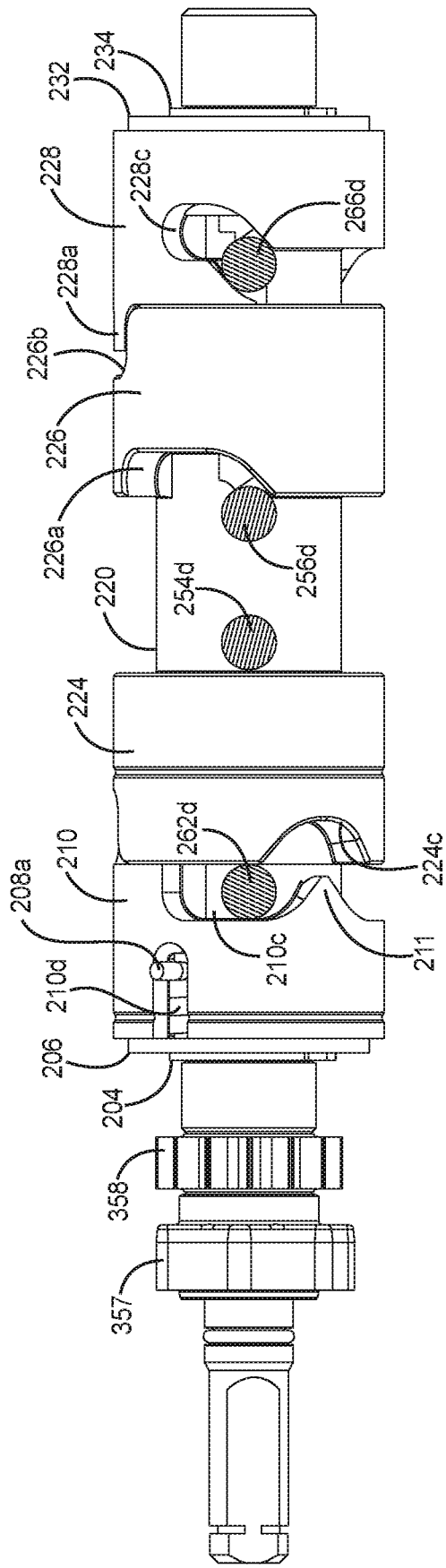
FIG. 9B is bottom view of a shift drum illustration pin placements during a shift of one exemplary embodiment.

FIG. 9A further illustrates the first shift collar pin 262d of the first shift collar 262 passed the tip of the mid ramp feature 211 of the first shift cam second profile 210c of the first shift cam 210 as the shift drum 220 rotates counter clockwise past low to the high gear. As illustrated in FIG. 9A, the first shift collar 262 has moved back to the first side wall 253a of the shift collar holding portion 254c of the shift fork 262 by the biasing force of the first collar biasing member 264. The first shift collar 262 is back in the neutral position. FIG. 9B illustrates a bottom view of the shift drum assembly 202 that includes the position of the first shift collar pin 262d, the first shift fork pin 254d, the second shift fork pin 256d and the second shift collar pin 266d when the first shift collar pin 262d moves past the tip of the mid ramp feature 211 of the first shift cam 210. As illustrated, the second shift fork pin 256 is beginning to enter the second collar first profile 226a of the second drum collar 226 and the second shift collar pin 266d is engaged with a ramp section of the second shift cam second profile 228c of the second shift cam 228.

Further, as the shift drum 220 rotates, the second shift collar pin 266d of the second shift collar 266 engaging the ramp section of the second shift cam profile 228c of the second shift cam 228 moves the second shift fork 256 and second dog 312 axially towards the high gear 314. If teeth 313 of the second shift dog 312 are lined up to be positioned between teeth 315 on the high gear 314 to lock rotation of the high gear 314 with rotation of the second shift dog 312, the shift drum 220 and second shift cam 228 rotate as one. Moreover, since the second shift collar 266 engages a first side wall 267a of the shift collar holding portion 256c of the second shift fork, the second shift fork 256 and the second shift dog 312 move axially to lock rotation of the high gear 314 to the rotation of the second shift dog 312 via engagement of the respective teeth 313 and 315.

Figure 9C:
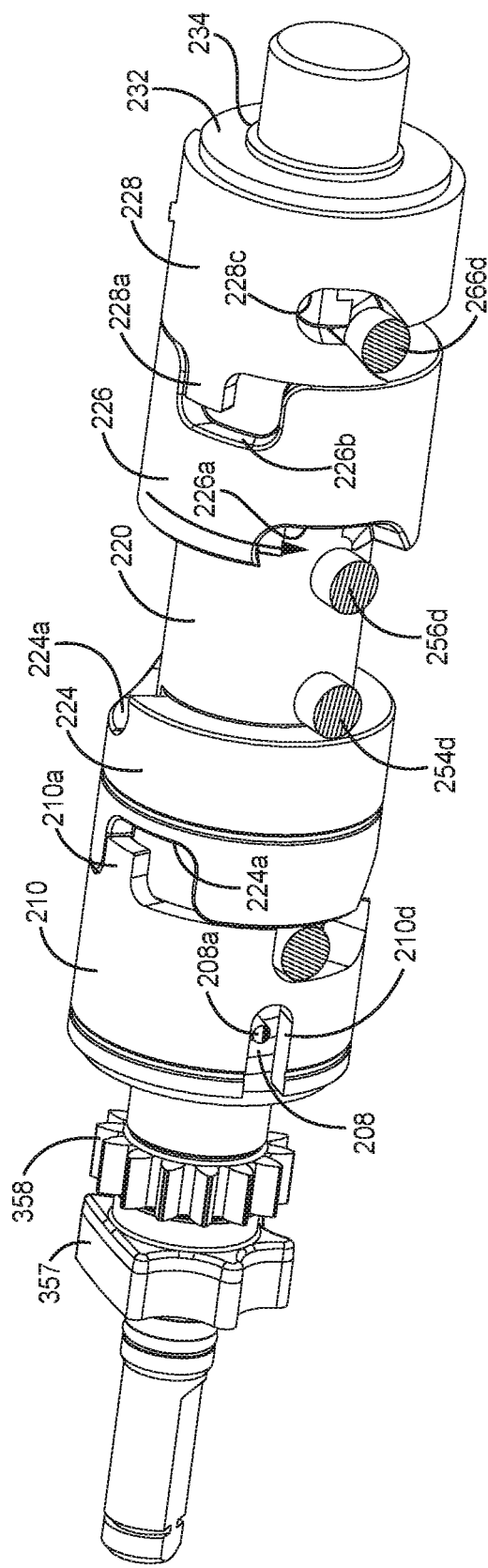
FIG. 9C is bottom perspective view of a shift drum illustration pin placements during a shift of one exemplary embodiment.
Figure 10A:
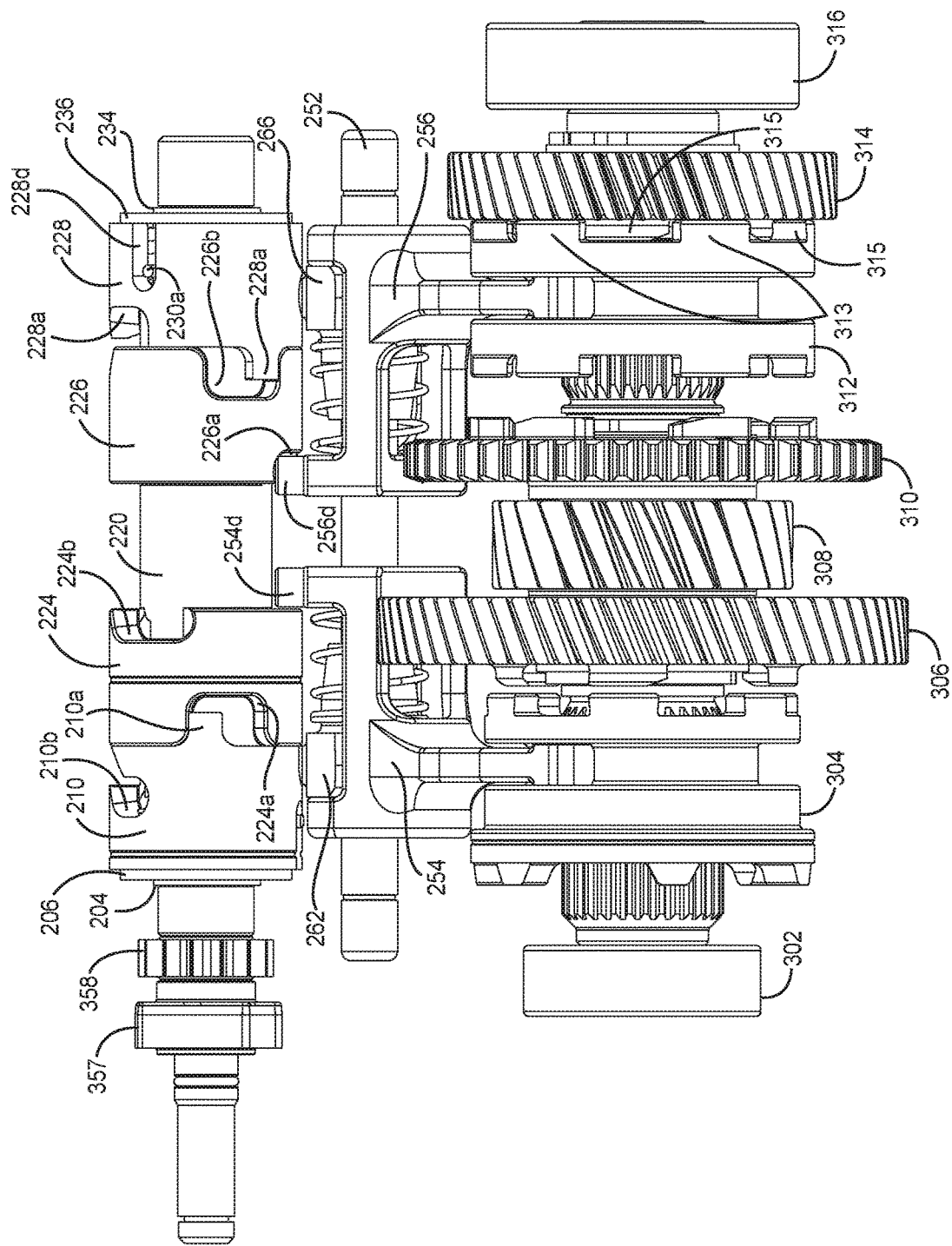
FIG. 10A is a side perspective view of a shifting system of FIG. 2 during a shift.

If teeth 313 of the second shift dog 312 are not lined up with teeth 315 on the high gear 314 (block condition), the second collar biasing member 268 is wound up by movement of the second shift cam 228 in relation to the second drum collar 226. FIG. 9C illustrates that the engagement of the second shift collar pin 266d on the ramp section of the second shift cam profile 228c as the shift drum 220 rotates counter clockwise moves the second shift cam 228 in relation to the second drum collar 226 until the second tab 228a of the second shift cam 228 engages a sidewall of the a second collar window 226b of the second drum collar 226. The counter clockwise rotation of the shift drum 220 winds up the second shift cam biasing member 230 increasing the bias force on the second shift cam 228 as the second tab 228a moves across the second collar window 226b of the second drum collar 226 from a first side wall to a second side wall of the window. Hence, the second collar window 226b allows a window distance of rotation between the second drum collar 226 and the second shift cam 228 that increases a bias force on the second shift cam 228. This bias force is used to complete the shift into high gear 314 when a blocked condition occurs. In particular, once the second shift dog 312 rotates enough for alignment of the teeth 313 and 315, the added torque on the second shift cam 228 rotates the second shift cam 228 causing the second shift collar pin 266d of the second shift collar 266 to continue up the ramp section of the second shift cam profile 228c therein moving the second shift collar 266 and second shift fork 256 axially further towards the third gear 314 therein locking rotation of the third gear 314 with rotation of the second sift dog 312. The shifting system in high gear 314 is illustrated in FIG. 10A. As illustrated, after the shift, the bias force causes the second tab 228a of the second shift cam 228 to move across the second collar window 226b of the second drum collar 226 from the second side wall back to first side wall of the window 226b.

Figure 10B:
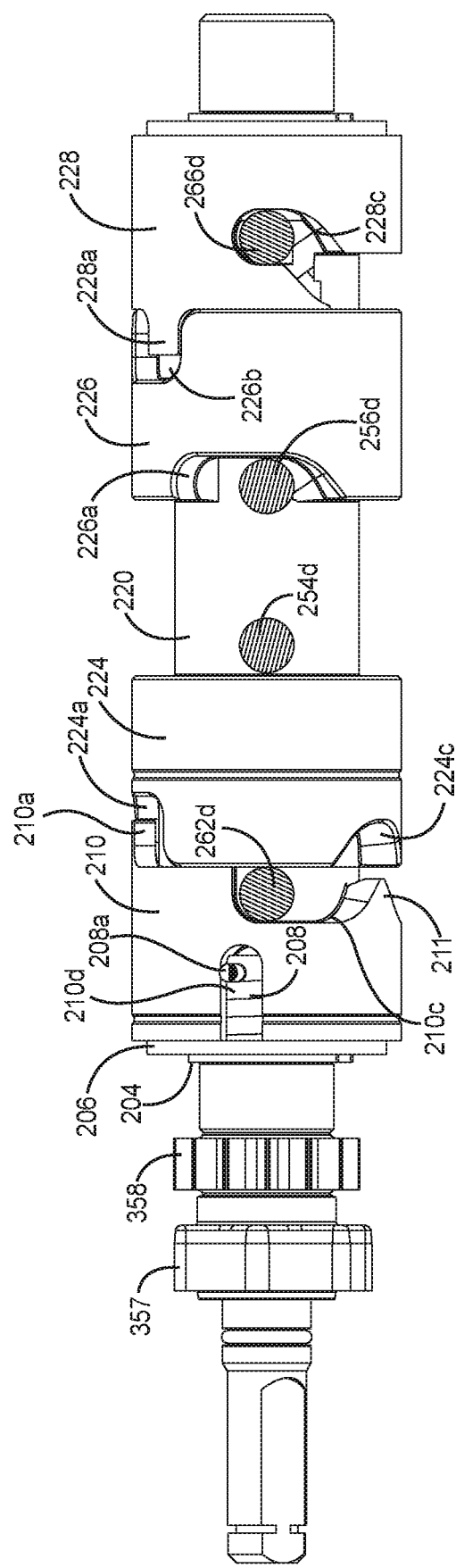
FIG. 10B is bottom view of a shift drum illustration pin placements during a shift of one exemplary embodiment.

FIG. 10B further illustrates the position of the first shift collar pin 262d, the first shift fork pin 254d, the second shift fork pin 256d and the second shift collar pin 266d when the shifting system 200 is in high gear 314. As illustrated, the second shift collar pin 266d has moved all the way up the ramp portion of the second shift cam profile 228c. Also illustrated, is how the second collar first profile 226a formed in a second side of the second shift collar 226 allows for the second shift fork 256 (connected to the second shift fork pin 256d) to move axially along with the second shift collar 266 (connected to the second shift collar pin 266d). The second collar first profile 226a is formed long enough to ensure second shift fork pin 256d is not blocked form moving freely as the second shift cam 228 winds up and the second shift fork 256 is pushed towards high gear.

In the high gear 314, the first shift collar pin 262d and the first shift fork pin 254d are positioned in a neutral portion of guides formed by profiles of the first shift cam 210 and the first drum collar 224 of the shift drum 220. The flat section of the second shift cam profile 228c of the second shift cam 228, illustrated in FIG. 10B blocks the second shift collar 266 (or second sub fork) and the second shift fork 256 from moving out of high gear mesh unintentionally due to any reaction forces between the shift dog and gear that try to move the shift dog out of mesh.

Figure 11A:
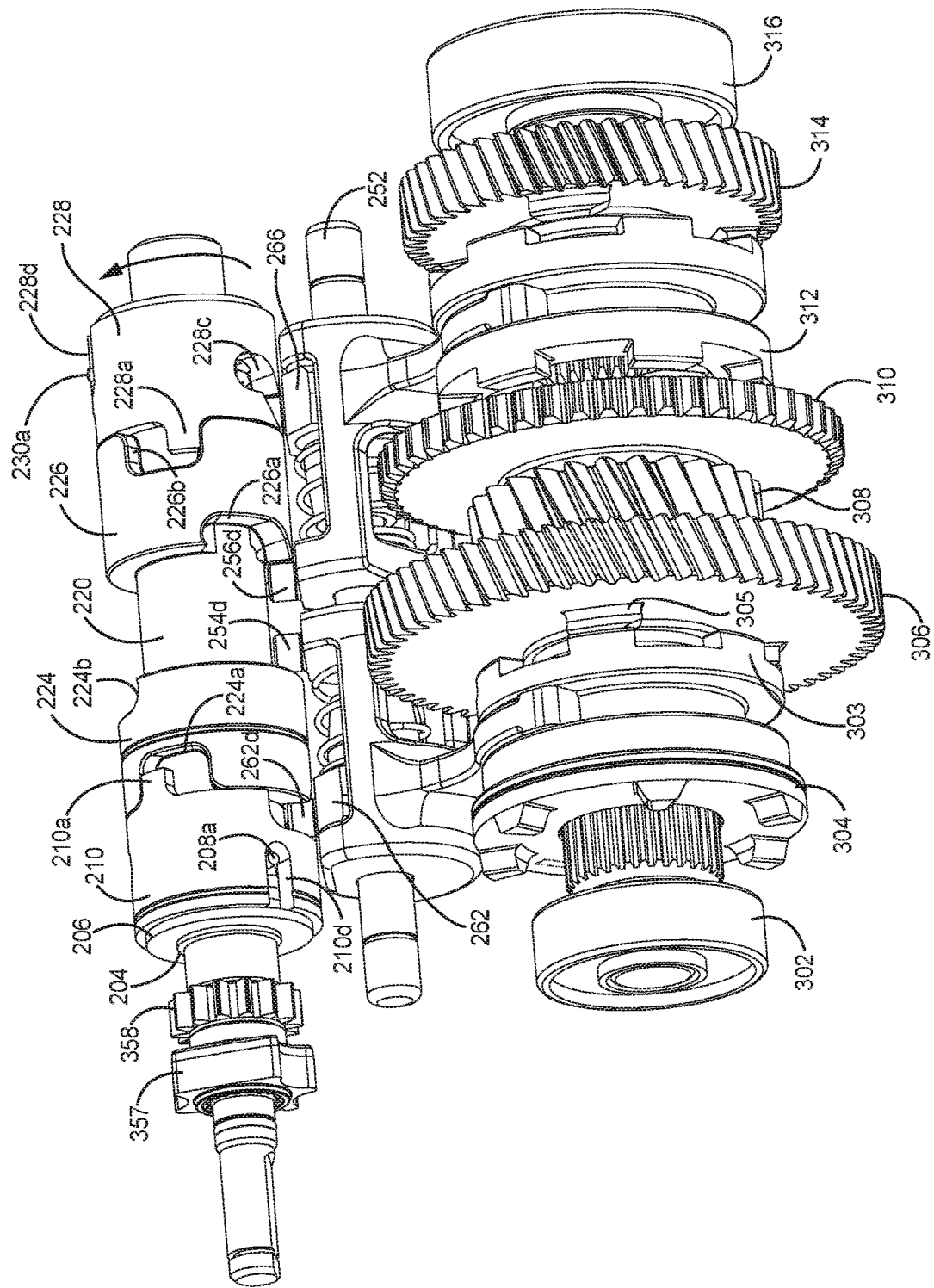
FIG. 11A is a side perspective view of a shifting system of FIG. 2 during a shift.
Figure 11B:
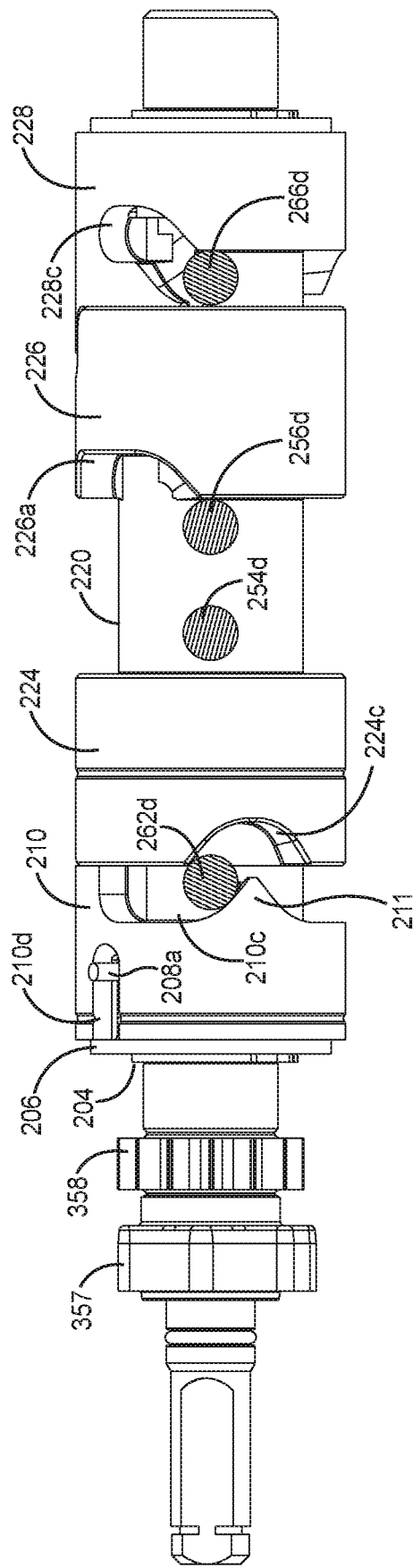
FIG. 11B is bottom view of a shift drum illustration pin placements during a shift of one exemplary embodiment.

To shift out of high gear 314, the shift drum 220 is rotated in the opposite direction (clockwise in this example embodiment). This is illustrated in FIGS. 11A and 11B. A solid out configuration is used to shift out of high gear in this embodiment. In particular, a ramp surface in the second collar first profile 226a is used to move the second shift fork pin 256d and connected second shift fork 256 axially away from the high gear 314. This solid out configuration, is used so that spring elements are not being compressed while shifting out of gear. This provides a direct positional relationship between the axial position of the shift dog relative to the angular position of the shift drum. Without the "solid out" function, a simple spring-in/spring-out type of design would not move the shift dog if it were bound into mesh due to residual torque on the drivetrain, unless the spring element was first compressed to its solid height. This lost motion would require additional rotation to be designed into the shift drum cam profiles, which hurts mechanical advantage of the shifting system. Moreover, due to the second tab 228a of the second shift cam 228 being pushed solidly by the edge of the first side wall of the second collar window 226b of the second drum collar 226, the second shift collar pin 266d of the second shift collar 266 rides up the ramp surface of the second shift cam profile 228c of the second shift cam 228. Hence, there is no additional windup between the second shift cam 228 and the second shift drum 226.

Regarding the first shift cam 210 and the first shift drum collar 224 when shifting out of high going back into low, the shift drum 220 is not solidly pushing on the first shift cam 210. As illustrated in FIG. 11A, the first tab 210a of the first shift cam 210 engaging a side wall of the first collar window 224a of the first drum collar 224. The biasing force created by the first shift cam biasing member 208 keeps the first tab 210a of the first shift cam 210 engaging a side wall of the first collar window 224a of the first drum collar 224 until the shift collar pin 262d of the first shift collar 262 moves towards the mid ramp feature 211 of the first shift cam second profile 210c of the first shift cam 210 as best illustrated in FIG. 11B. If the first shift dog 304 lands blocked from engaging the low gear 306, in one embodiment, the shift drum 220 rotates relative to the first shift cam 210. In particular, the shift drum 220 and cam 210 rotate as one until the cam 210 is stopped from rotating due to the shift fork 254 hitting the blocked condition, at which point the shift drum 220 continues to rotate until the detent mechanism 357 drops into a target gear position and holds the shift cam preload. Either way there is a relative rotation between the two components.) (i.e. the first drum collar 224 of the shift drum 220) which winds up the first shift cam biasing member 208. This in turn asserts a force on the first shift collar 262 compressing the first collar biasing member 264 in moving the first shift collar 262 (sub fork) towards the first shift fork pin 254d of the first shift fork 254. Once the first shift dog moves to align the teeth 303 of the first shift dog 304 with the teeth of the low gear 306, the bias forces caused by the first collar biasing member 264 and the first shift cam biasing member 208 complete the shift.

In one embodiment, the first shift cam biasing member 208 may not wind up at all in completing a shift into low. Depending on the torsion spring's (first shift cam biasing member 208) rate and preload and the compression spring's (first collar biasing member 264) rate and preload, the first shift collar 262 could just be pushed axially without the first shift cam 210 having relative rotation motion with the shift drum 220. Moreover, as stated above, in an embodiment, a combination of shift cam and shift collar could also be used. Either way, the "spring in" function (or "spring preloaded shift into gear" function") is used to complete the shift. A pass through can also be accomplished in this manner.

If the first shift dog 304 is not blocked into engaging the low gear 306, the first shift dog 304 simply goes into mesh and the first shift collar 262 and the first shift fork 254 simply shuttle over to the low gear position by the first shift collar pin 262d of the first shift collar 262 following the guide path formed by the first shift cam second profile 210c of the first shift cam 210 and the first collar second profile 224c in the first side of the first drum collar 224.

In some embodiments, the shift from neutral to reverse, to park and back to neutral in this is essentially the same as described above relation to the shifting from neutral to low, to high, and back to neutral.

Figure 12:
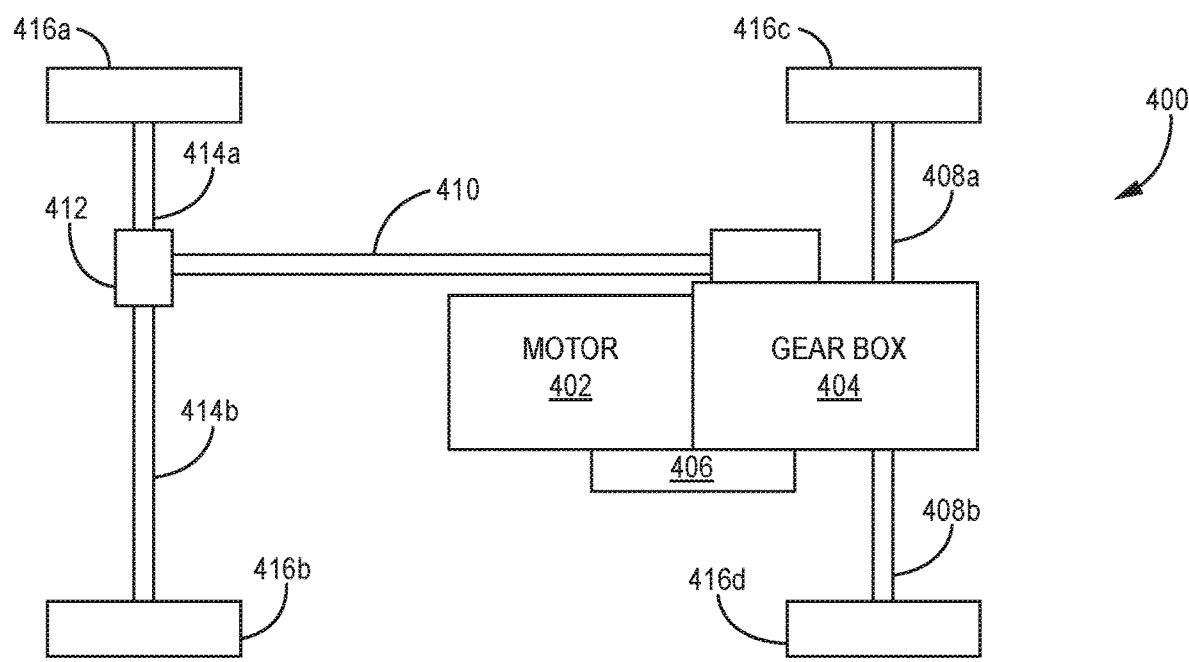
FIG. 12 is a block diagram of a vehicle of one exemplary embodiment.

Referring to FIG. 12 a block diagram example of a vehicle implementing a shifting system 200 as described above is illustrated. This example vehicle 400 includes a motor that generates rotational torque. The motor 402 maybe an internal combustion engine, an electric motor or any type of motor that generates torque. The motor torque is provided to the gear box 404 which includes the shifting system 200 described above. In an embodiment, a continuously variable transmission (CVT) 406 is used to interface the motor toque to the gear box 404. The gear box may be a transmission, a transaxle and the like. The gear box 404 includes three outputs. Rear outputs of the gear box 404 are respectfully coupled to first and second rear half shafts 408a and 408b which couple the torque to rear wheels 416c and 416d. A front output of the gear box 404 is coupled to drive shaft 410. Drive shaft 410 is coupled to a front differential 412. The front differential 412 in turn couples the torque to respective front haft shafts 414a and 414b which are coupled to front wheels 416a and 416b. Although, the vehicle is shown as having four wheels, the shifting system can be applied to any type of vehicle implementing a shift drum including, but not limited to, track vehicles, vehicles with more or less than four wheels, four wheel drive vehicles, two wheel drive vehicles, etc.

As discussed above, embodiments provide shifting mechanism that is spring loaded such that if the shift dogs 304 and 312 are in a blocked condition, the shift mechanism can preload and finish the shift at some later time once relative motion occurs. Moreover, a shifting mechanism is provided that is not only spring loaded but allows "pass-through" shifting that allows the mechanism to go into any gear position and be spring loaded such that if the dogs 304 and 312 are blocked, you may pass thru that position if desired and provide a spring preload to finish the shift into the desired gear position. Moreover, embodiments, lock the shift forks 245 and 256 in position once the desired gear is fully engaged, rather than having the shift dogs held in position with a spring preload.

Example Embodiments

Example 1 is a shifting system. The shifting system includes a gear assembly, a shift rail assembly and a shift drum assembly. The gear assembly includes a gear shaft, at least one gear mounted on the gear shaft and at least one shift dog. The at least one shift dog is axially movable on the gear shaft while locked to a rotation of the gear shaft. The at least one shift dog is configured to selectively lock rotation of the at least one gear to the at least one shift dog. The shift rail assembly includes a shift rail, at least one shift fork, at least one shift collar and at least one biasing member. The at least one shift fork is axially movable on the shift rail. The at least one shift fork has a first end engaged with the at least one shift dog of the gear assembly. The at least one shift fork further has a second end with spaced side walls and a shift fork pin that extends from one of the spaced side walls. The at least one shift collar is axially movable on the shift rail between the spaced side walls of the at least one shift fork. The at least one shift collar has a shift collar pin. The at least one biasing member is configured to bias the at least one shift collar against one of the spaced side walls of the at least one shift fork. The shift drum assembly is configured to rotate during a shift. The shift drum has at least one shift guide profile that receives at least one of the shift fork pin and the shift collar pin to guide the at least one shift fork during a shift of the shifting system.

Example 2, includes the shifting system of Example 1, wherein the second end of the at least one shift fork further has a holding cavity positioned between the spaced side walls, the at least one shift collar received in the cavity.

Example 3 includes the shifting system of any of the Examples 1-2, wherein the at least one biasing member is positioned between the at least one shift collar and another one of the spaced side walls.

Example 4 includes the shifting system of any of the Examples 1-3, wherein the shift drum assembly further includes a shift drum, at least one shift cam and at least one shift cam biasing member. The shift drum has at least one drum collar including at least one window profile and at least one collar guide profile. The at least one shift cam is rotationally coupled to the shift drum. The at least one shift cam has a tab received within the window profile of the at least one drum collar. The at least one shift cam further having at least one cam guide profile. The at least one collar guide profile of the at least one drum collar and the at least one cam guide profile form the at least one shift guide profile. The at least one shift cam biasing member is configured and arranged to assert a biasing force between the shift drum and the at least one shift cam.

Example 5 includes the shifting system of any of the Examples 1-4, wherein the at least one shift collar further includes first and second opposably extending collar arms that pilot the at least one shift collar on a portion of the shift drum assembly. The shift collar pin is positioned between the first and second opposably extending collar arms.

Example 6 includes the shifting system of Example 5, wherein the first and second opposably extending collar arms pilot on at least one shift cam mounted on a shift drum of the shift drum assembly.

Example 7 includes the shifting system of any of the Examples 1-6, further wherein the at least one gear includes at least a low gear and a high gear. The at least one shift dog includes at least a first and second shift dog. The at least one shift fork includes at least a first and second shift fork. The at least one shift collar includes at least a first and second shift collar and the at least one biasing member includes at least a first and second biasing member.

Example 8 includes the shifting system of any of the Examples 1-7, wherein the at least one shift fork, the at least one shift collar and the at least one biasing member are configured and arranged to create a spring in function into the at least one gear and a solid out function out of the at least one gear.

Example 9 includes a shifting system that includes a shift drum having a plurality of cam tracks, at least one shift dog, at least one gear, a shift rail, at least one shift fork, at least one sub-fork and a biasing member for each at least one sub-fork. The at least one shift dog is configured to selectively engage the at least one gear. The at least one shift fork has a first end engaged with the at least one shift dog and a second end slidably coupled to the shift rail. The second end of the at least one main shift fork has a shift fork pin received in a first cam track of the plurality of cam tracks of the shift drum assembly. The at least one sub-fork is further slidably coupled to the shift rail. The at least one sub-fork has a sub-fork pin received in a second cam track of the plurality of cam tracks of the shift drum assembly. The biasing member for each at least one sub-fork is received around the shift rail. The at least one sub-fork and biasing member are positioned such that pushing the at least one sub-fork in a first direction causes it to solidly push against a first sidewall of the second end of the at least one shift fork so that the at least one sub-fork moves in concert with the at least one shift fork. The at least one sub-fork and biasing member are further positioned such that movement of the at least one sub-fork in a second direction on the shift rail pushes against the biasing member which in turn pushes against a second sidewall of the second end of the at least one shift fork compressing the biasing member to create a preload bias that is used at least in part to pass thru the at least one gear without requiring shift dog teeth of the at least one shift dog and at least one gear to fully mesh.

Example 10 includes the shifting system of Example 9, wherein the second end of the at least one shift fork further has a holding cavity positioned between the spaced first and second sidewalls. The at least one sub-fork is received in the cavity.

Example 11 includes the shifting system of any of the Examples 9-10, wherein the shift drum assembly further includes a shift drum, at least one shift cam and at least one shift cam biasing member. The shift drum has at least one drum collar that includes at least one window profile and at least one collar guide profile. The least one shift cam is rotationally coupled to the shift drum. The at least one shift cam has a tab received within the window profile of the at least one drum collar. The at least one cam further having at least one cam guide profile. The at least one collar guide profile of the at least one drum collar and the at least one cam guide profile forming at least part of the plurality of cam tracks. The at least one shift cam biasing member is configured and arranged to assert a biasing force between the shift drum and the at least one shift cam.

Example 12 includes the shifting system of any of the Examples 9-11, wherein the at least one sub-fork further includes first and second opposably extending collar arms that pilot the at least one sub-fork on a portion of the shift drum assembly. The sub-fork pin positioned between the first and second opposably extending collar arms.

Example 13 includes the shifting system of any of the Examples 9-12, further wherein the at least one gear includes at least a low gear and a high gear. The at least one shift dog includes at least a first and second shift dog. The at least one shift fork includes at least a first and second shift fork. The at least one sub-fork includes at least a first and second shift collar and the at least one biasing member includes at least a first and second biasing member.

Example 14 includes the shifting system of any of the Examples 9-13, wherein the at least one shift fork, the at least one sub-fork and the at least one biasing member are configured and arranged to create a spring in function into the at least one gear and a solid out function out of the at least one gear.

Example 15, includes the shifting system of any of the Examples 9-14, further comprises a detent mechanism configured and arranged to hold at least the shift drum assembly in a preloaded state when a blocked shift occurs.

Example 16 is a vehicle including a motor to provide motor torque, a transmission to receive the motor torque, a drivetrain coupled to receive torque from the transmission and a shifting system. The shifting system includes a shift rail assembly and a shift drum assembly. The shift rail assembly includes a shift rail, at least one shift fork, at least one shift collar and at least one biasing member. The at least one shift fork is axially movable on the shift rail. The at least one shift fork has a first end engaged with at least one shift dog of a gear assembly of the transmission. The at least one shift fork further has a second end with spaced side walls and a shift fork pin extending from one of the spaced side walls. The at least one shift collar is axially movable on the shift rail between the spaced side walls of the at least one shift fork. The at least one shift collar has a shift collar pin. The at least one biasing member is configured to bias the at least one shift collar against one of the spaced side walls of the at least one shift fork. The shift drum assembly is configured to rotate during a shift. The shift drum has at least one shift guide profile that receives at least one of the shift fork pin and the shift collar pin to guide the at least one shift fork during a shift of the shifting system.

Example 17 includes the vehicle of Example 16, wherein the second end of the at least one shift fork further has a holding cavity positioned between the spaced side walls. At least a portion of the at least one shift collar is received within the cavity.

Example 18 includes the shifting system of any of the Examples 16-17, wherein the at least one biasing member is positioned between the at least one shift collar and another one of the spaced side walls.

Example 19 includes the shifting system of any of the Examples 16-18, wherein the shift drum assembly further includes a shift drum, at least one shift cam and at least one shift cam biasing member. The shift drum has at least one drum collar including at least one window profile and at least one collar guide profile. The at least one shift cam is rotationally coupled to the shift drum. The at least one shift cam has a tab received within the window profile of the at least one drum collar. The at least one shift cam further having at least one cam guide profile. The at least one collar guide profile of the at least one drum collar and the at least one cam guide profile form the at least one shift guide profile. The at least one shift cam biasing member is configured and arranged to assert a biasing force between the shift drum and the at least one shift cam.

Example 20 includes the shifting system of any of the Examples 16-19, wherein the at least one shift fork, the at least one shift collar and the at least one biasing member are configured and arranged to create a spring in function into the at least one gear and a solid out function out of the at least one gear.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A shifting system comprising:
 a gear assembly including,
  a gear shaft,
  at least one gear mounted on the gear shaft, and
  at least one shift dog axially movable on the gear shaft while locked to a rotation of the gear shaft, the at least one shift dog configured to selectively lock rotation of the at least one gear to the at least one shift dog;
 a shift rail assembly including,
  a shift rail,
  at least one shift fork axially movable on the shift rail, the at least one shift fork having a first end engaged with the at least one shift dog of the gear assembly, the at least one shift fork further have a second end with spaced side walls and a shift fork pin extending from one of the spaced side walls,
  at least one shift collar axially movable on the shift rail between the spaced side walls of the at least one shift fork, the at least one shift collar having a shift collar pin, and
  at least one biasing member configured to bias the at least one shift collar against one of the spaced side walls of the at least one shift fork; and
 a shift drum assembly configured to rotate during a shift, the shift drum assembly having at least one shift guide profile that receives at least one of the shift fork pin and the shift collar pin to guide the at least one shift fork during a shift of the shifting system.

2. The shifting system of claim 1, wherein the second end of the at least one shift fork further has a holding cavity positioned between the spaced side walls, the at least one shift collar received in the cavity.

3. The shifting system of claim 1, wherein the at least one biasing member is positioned between the at least one shift collar and another one of the spaced side walls.

4. The shifting system of claim 1, wherein the shift drum assembly further comprises:
 a shift drum having at least one drum collar including at least one window profile and at least one collar guide profile;

at least one shift cam rotationally coupled to the shift drum, the at least one shift cam having a tab received within the window profile of the at least one drum collar, the at least one shift cam further having at least one cam guide profile, the at least one collar guide profile of the at least one drum collar and the at least one cam guide profile forming the at least one shift guide profile; and at least one shift cam biasing member configured and arranged to assert a biasing force between the shift drum and the at least one shift cam.

5. The shifting system of claim 1, wherein the at least one shift collar further comprises:

first and second opposably extending collar arms that pilot the at least one shift collar on a portion of the shift drum assembly, the shift collar pin positioned between the first and second opposably extending collar arms.

6. The shifting system of claim 5, wherein the first and second opposably extending collar arms pilot on at least one shift cam mounted on a shift drum of the shift drum assembly.

7. The shifting system of claim 1, further wherein:

the at least one gear includes at least a low gear and a high gear;

the at least one shift dog includes at least a first and second shift dog;

the at least one shift fork includes at least a first and second shift fork;

the at least one shift collar includes at least a first and second shift collar; and the at least one biasing member includes at least a first and second biasing member.

8. The shifting system of claim 1, wherein the at least one shift fork, the at least one shift collar and the at least one biasing member are configured and arranged to create a spring in function into the at least one gear and a solid out function out of the at least one gear.

9. A shifting system comprising:

a shift drum assembly having a plurality of cam tracks;

at least one shift dog;

at least one gear, the at least one shift dog configured to selectively engage the at least one gear;

a shift rail;

at least one shift fork having a first end engaged with the at least one shift dog and a second end slidably coupled to the shift rail, the second end of the at least one shift fork having a shift fork pin received in a first cam track of the plurality of cam tracks of the shift drum assembly;

at least one sub-fork further slidably coupled to the shift rail, the at least one sub-fork having a sub-fork pin received in a second cam track of the plurality of cam tracks of the shift drum assembly; and a biasing member for each at least one sub-fork received around the shift rail, the at least one sub-fork and biasing member positioned such that pushing the at least one sub-fork in a first direction causes the at least one sub-fork to solidly push against a first sidewall of the second end of the at least one shift fork so that the at least one sub-fork moves in concert with the at least one shift fork, the at least one sub-fork and biasing member further positioned such that movement of the at least one sub-fork in a second direction on the shift rail pushes against the biasing member which in turn pushes against a second sidewall of the second end of the at least one shift fork compressing the biasing member to create a preload bias that is used at least in part to pass thru the at least one gear without requiring shift dog teeth of the at least one shift dog and at least one gear to fully mesh.

10. The shifting system of claim 9, wherein the second end of the at least one shift fork further has a holding cavity positioned between the spaced first and second sidewalls, the at least one sub-fork received in the cavity.

11. The shifting system of claim 9, wherein the shift drum assembly further comprises:

a shift drum having at least one drum collar including at least one window profile and at least one collar guide profile;

at least one shift cam rotationally coupled to the shift drum, the at least one shift cam having a tab received within the window profile of the at least one drum collar, the at least one shift cam further having at least one cam guide profile, the at least one collar guide profile of the at least one drum collar and the at least one cam guide profile forming at least part of the plurality of cam tracks; and at least one shift cam biasing member configured and arranged to assert a biasing force between the shift drum and the at least one shift cam.

12. The shifting system of claim 9, wherein the at least one sub-fork further comprises:

first and second opposably extending collar arms that pilot the at least one sub-fork on a portion of the shift drum assembly, the sub-fork pin positioned between the first and second opposably extending collar arms.

13. The shifting system of claim 9, further wherein:

the at least one gear includes at least a low gear and a high gear;

the at least one shift dog includes at least a first and second shift dog;

the at least one shift fork includes at least a first and second shift fork;

the at least one sub-fork includes at least a first and second shift collar; and the at least one biasing member includes at least a first and second biasing member.

14. The shifting system of claim 9, wherein the at least one shift fork, the at least one sub-fork and the at least one biasing member are configured and arranged to create a spring in function into the at least one gear and a solid out function out of the at least one gear.

15. The shifting system of claim, 9, further comprising:

a detent mechanism configured and arranged to hold at least the shift drum assembly in a preloaded state when a blocked shift occurs.

16. A vehicle comprising:

a motor to provide motor torque;

a transmission to receive the motor torque;

a drivetrain coupled to receive torque from the transmission; and a shifting system including, a shift rail assembly including, a shift rail, at least one shift fork axially movable on the shift rail, the at least one shift fork having a first end engaged with at least one shift dog of a gear assembly of the transmission, the at least one shift fork further have a second end with spaced side walls and a shift fork pin extending from one of the spaced side walls, at least one shift collar axially movable on the shift rail between the spaced side walls of the at least one shift fork, the at least one shift collar having a shift collar pin, at least one biasing member configured to bias the at least one shift collar against one of the spaced side walls of the at least one shift fork; and a shift drum assembly configured to rotate during a shift, the shift drum assembly having at least one shift guide profile that receives at least one of the shift fork pin and the shift collar pin to guide the at least one shift fork during a shift of the shifting system.

17. The vehicle of claim 16, wherein the second end of the at least one shift fork further has a holding cavity positioned between the spaced side walls, at least a portion of the at least one shift collar received within the cavity.

18. The vehicle of claim 16, wherein the at least one biasing member is positioned between the at least one shift collar and another one of the spaced side walls.

19. The vehicle of claim 16, wherein the shift drum assembly further comprises:

a shift drum having at least one drum collar including at least one window profile and at least one collar guide profile;

at least one shift cam rotationally coupled to the shift drum, the at least one shift cam having a tab received within the window profile of the at least one drum collar and at least one cam guide profile, the at least one collar guide profile of the at least one drum collar and the at least one cam guide profile forming the at least one shift guide profile; and at least one shift cam biasing member configured and arranged to assert a biasing force between the shift drum and the at least one shift cam.

20. The vehicle of claim 16, wherein the at least one shift fork, the at least one shift collar and the at least one biasing member are configured and arranged to create a spring in function into the at least one gear and a solid out function out of the at least one gear.

* * * * *